US012093282B2

(12) United States Patent
Hattori

(10) Patent No.: US 12,093,282 B2
(45) Date of Patent: Sep. 17, 2024

(54) DATABASE SYSTEM, COMPUTER PROGRAM PRODUCT, AND DATA PROCESSING METHOD

(71) Applicants: KABUSHIKI KAISHA TOSHIBA, Tokyo (JP); TOSHIBA SOLUTIONS CORPORATION, Kawasaki (JP)

(72) Inventor: Masakazu Hattori, Inagi (JP)

(73) Assignees: Kabushiki Kaisha Toshiba, Tokyo (JP); Toshiba Solutions Corporation, Kawasaki (JP)

(*) Notice: Subject to any disclaimer, the term of this patent is extended or adjusted under 35 U.S.C. 154(b) by 38 days.

(21) Appl. No.: 18/167,959

(22) Filed: Feb. 13, 2023

(65) Prior Publication Data
US 2023/0244694 A1 Aug. 3, 2023

Related U.S. Application Data

(63) Continuation of application No. 14/206,819, filed on Mar. 12, 2014, now abandoned, which is a
(Continued)

(51) Int. Cl.
*G06F 16/27* (2019.01)
*G06F 16/22* (2019.01)

(52) U.S. Cl.
CPC ......... *G06F 16/27* (2019.01); *G06F 16/2282* (2019.01); *G06F 16/275* (2019.01); *G06F 16/278* (2019.01)

(58) Field of Classification Search
None
See application file for complete search history.

(56) References Cited

U.S. PATENT DOCUMENTS 5,555,404 A 9/1996 Torbjørnsen et al.
5,970,495 A 10/1999 Baru
(Continued)

FOREIGN PATENT DOCUMENTS

JP H3-92942 A 4/1991
JP H9-146812 A 6/1997
(Continued)

OTHER PUBLICATIONS

International Search Report and Written Opinion issued by the Japanese Patent Office on Oct. 8, 2013, for International Application No. PCT/JP2013/072884.
(Continued)

*Primary Examiner* — Augustine K. Obisesan
(74) *Attorney, Agent, or Firm* — Finnegan, Henderson, Farabow, Garrett & Dunner, LLP

(57) ABSTRACT

According to an embodiment, a database system includes a plurality of nodes in which a database is stored; and a management device configured to manage the plurality of nodes. The management device includes a first assigning unit and a second assigning unit. Depending on a change in state of each of the plurality of nodes, the first assigning unit assigns a first node, which stores therein data pieces and receives an access request with respect to the data pieces, and assign a second node, which stores therein the data pieces and serves as a backup node for the first node, and instructs each of the plurality of nodes to perform operations according to assignment. Depending on a state of the plurality of nodes and depending on a change in assignment state of the first node and the second node, the second assigning unit assigns a third node which is a candidate node to serve as the first node or the second node, and instructs each of the plurality of nodes to make preparation for causing the third node to operate as the first node or the
(Continued)

second node. Each of the plurality of nodes includes a transferring unit configured to send the data pieces of the first node or the second node to the third node.

11 Claims, 22 Drawing Sheets

Related U.S. Application Data continuation of application No. PCT/JP2013/056868, filed on Mar. 12, 2013.

(56) References Cited

U.S. PATENT DOCUMENTS

| | | | |
|---|---|---|---|
| RE37,600 E | 3/2002 | Weinger | |
| 6,421,687 B1 | 7/2002 | Klostermann | |
| 6,438,707 B1 | 8/2002 | Ronström | |
| 6,643,656 B2 | 11/2003 | Peterson | |
| 6,748,508 B1 | 6/2004 | Khandelwal et al. | |
| 6,883,112 B2 | 4/2005 | Maeda et al. | |
| 6,915,409 B1 | 7/2005 | Peterson | |
| 7,152,184 B2 | 12/2006 | Maeda et al. | |
| 7,425,944 B1 | 9/2008 | Peterson | |
| 7,596,757 B2 | 9/2009 | Kowalski et al. | |
| 8,280,574 B2 | 10/2012 | Yabushita et al. | |
| 9,081,695 B2 | 7/2015 | Tsuchimoto et al. | |
| 9,268,650 B2 | 2/2016 | Min | |
| 9,305,072 B2 | 4/2016 | Urano | |
| 9,367,261 B2 | 6/2016 | Iwashita | |
| 2003/0051111 A1 | 3/2003 | Nakano et al. | |
| 2003/0097533 A1 | 5/2003 | Maeda et al. | |
| 2004/0109436 A1 | 6/2004 | Vargas | |
| 2005/0132157 A1 | 6/2005 | Maeda et al. | |
| 2005/0278392 A1 | 12/2005 | Hansen | |
| 2006/0117073 A1 | 6/2006 | Bosworth et al. | |
| 2006/0117154 A1 | 6/2006 | Suishu | |
| 2006/0203718 A1 | 9/2006 | Benhase | |
| 2007/0185923 A1 | 8/2007 | Nishikawa et al. | |
| 2007/0198802 A1 | 8/2007 | Kavuri | |
| 2008/0005508 A1 | 1/2008 | Asano et al. | |
| 2008/0147673 A1 | 6/2008 | Candea | |
| 2008/0288630 A1 | 11/2008 | Merat | |
| 2009/0049240 A1 | 2/2009 | Oe | |
| 2009/0193206 A1 | 7/2009 | Ishii et al. | |
| 2009/0210533 A1 | 8/2009 | Verhaegh et al. | |
| 2009/0210642 A1 | 8/2009 | Yagawa | |
| 2009/0216975 A1 | 8/2009 | Halperin et al. | |
| 2010/0076939 A1 | 3/2010 | Iwaki | |
| 2010/0114949 A1 | 5/2010 | Sakamoto | |
| 2010/0306495 A1 | 12/2010 | Kumano | |
| 2010/0315946 A1 | 12/2010 | Salam | |
| 2011/0016090 A1 | 1/2011 | Krishnaprasad et al. | |
| 2011/0055182 A1 | 3/2011 | Buban | |
| 2011/0283277 A1 | 11/2011 | Castillos | |
| 2011/0289049 A1 | 11/2011 | Zeng | |
| 2012/0078849 A1 | 3/2012 | Bryant et al. | |
| 2012/0137094 A1 | 5/2012 | Gupta | |
| 2012/0166390 A1* | 6/2012 | Merriman | G06F 16/2365 707/613 |
| 2013/0031051 A1 | 1/2013 | Mujumdar | |
| 2013/0132450 A1 | 5/2013 | Tsuchimoto et al. | |
| 2013/0138904 A1 | 5/2013 | Min | |
| 2013/0149678 A1 | 6/2013 | Tokuda | |
| 2013/0166606 A1 | 6/2013 | Fricke | |
| 2014/0032496 A1 | 1/2014 | Urano | |
| 2014/0059315 A1 | 2/2014 | Iwashita | |
| 2014/0074891 A1 | 3/2014 | Davis et al. | |
| 2014/0157041 A1* | 6/2014 | Danielsson | G06F 11/2043 714/4.2 |
| 2014/0279902 A1 | 9/2014 | Hattori | |
| 2015/0047252 A1 | 2/2015 | Goerz, Jr. | |
| 2015/0051849 A1 | 2/2015 | Torayashiki | |
| 2017/0237683 A1 | 8/2017 | Vlachogiannis et al. | |

FOREIGN PATENT DOCUMENTS

| | | |
|---|---|---|
| JP | H11-506556 A | 6/1999 |
| JP | 2000-132441 A | 5/2000 |
| JP | 2001-508900 A | 7/2001 |
| JP | 2002-522845 A | 7/2002 |
| JP | 2003-122509 A | 4/2003 |
| JP | 2003-223287 A | 8/2003 |
| JP | 2003-345640 A | 12/2003 |
| JP | 2005-196602 A | 7/2005 |
| JP | 2007-200114 A | 8/2007 |
| JP | 2007-524933 A | 8/2007 |
| JP | 2008-15623 A | 1/2008 |
| JP | 2008-310591 A | 12/2008 |
| JP | 2009-157785 A | 7/2009 |
| JP | 2009-527971 A | 7/2009 |
| JP | 2009-181206 A | 8/2009 |
| JP | 2011-513816 A | 4/2011 |
| JP | 2012-221419 A | 11/2012 |
| JP | 2013-008291 A | 1/2013 |
| JP | 2013-109672 A | 6/2013 |
| JP | 2013-114556 A | 6/2013 |
| WO | WO 2013/046352 A1 | 4/2013 |

OTHER PUBLICATIONS

International Search Report issued by the Japanese Patent Office on Nov. 5, 2013, for International Application No. PCT/JP2013/072305.
Notification of First Office Action issued by the State Intellectual Property Office (SIPO) of the People's Republic of China, dated Jul. 4, 2016, with English translation (27 pp.).
Patent Examination Report No. 1 issued by the Australian Intellectual Property Office on Sep. 30, 2015, for Australian Patent Application No. 2013381504.
Replication—MongoDB Manual, Internet ].URL:http://docs.mongodb.org/manual/replication/, downloaded Jan. 22, 2013, 2 pages.
Sharding—MongoDB Manual, Internet URL:http://docs.mongodb.org/manual/sharding/, downloaded Jan. 22, 2013, 2 pages.
MongoDB Manual Contents, Internet URL http://docs.mongodb.org/manual/contents /, downloaded Jan. 22, 2013, 7 pages.

* cited by examiner

FIG.3

| DATA RETENTION TABLE | | PARTITION | | |
|---|---|---|---|---|
| | | PARTITION #1 | PARTITION #2 | PARTITION #3 |
| NODE | NODE A | 80 | | 60 |
| | NODE B | 80 | 100 | |
| | NODE C | | 90 | 60 |

FIG.4

| CURRENT-ROLE TABLE | | PARTITION | | |
|---|---|---|---|---|
| | | PARTITION #1 | PARTITION #2 | PARTITION #3 |
| NODE | NODE A | OWNER | NONE | BACKUP |
| | NODE B | BACKUP | OWNER | NONE |
| | NODE C | NONE | NONE | OWNER |

FIG.5

| NEXT-ROLE TABLE | | PARTITION | | |
|---|---|---|---|---|
| | | PARTITION #1 | PARTITION #2 | PARTITION #3 |
| NODE | NODE A | OWNER | NONE | BACKUP |
| | NODE B | BACKUP | OWNER | NONE |
| | NODE C | NONE | NONE | OWNER |

FIG.6

| TARGET-ROLE TABLE | | PARTITION | | |
|---|---|---|---|---|
| | | PARTITION #1 | PARTITION #2 | PARTITION #3 |
| NODE | NODE A | MID-BACKUP | | MID-BACKUP |
| | NODE B | MID-BACKUP | MID-BACKUP | |
| | NODE C | | MID-BACKUP | MID-BACKUP |

DATABASE SYSTEM, COMPUTER PROGRAM PRODUCT, AND DATA PROCESSING METHOD

CROSS-REFERENCE TO RELATED APPLICATIONS

This application is a continuation of U.S. application Ser. No. 14/206,810, filed Mar. 12, 2014, which is a continuation of PCT international application Ser. No. PCT/JP2013/056868 filed on Mar. 12, 2013 which designates the United States, the entire contents of which are incorporated herein by reference.

FIELD

Embodiments described herein relate generally to a database system, a computer program product, and a data processing method.

BACKGROUND

Shared-Nothing Type Database

Conventionally, a shared-nothing type database system is known in which a plurality of database nodes is connected to each other by a network.

Each of a plurality of database nodes is a computer that has individual resources such as a processor, a memory, and a storage. In a shared-nothing type database system, total separation of resources is achieved for each database node. Hence, there occurs no access competition among the database nodes. As a result, in a shared-nothing type database system, if the number of database nodes is increased, the performance can be enhanced in a linear manner. That is, in a shared-nothing type database system, it is possible to efficiently implement the scale-out capability in which database nodes are added.

Partitioning

In a shared-nothing type database system, it is possible to implement a technology called partitioning in which a database is divided into a plurality of data pieces (called partitions), and each of the divided data pieces is stored in a plurality of database nodes in a distributed manner. In a shared-nothing type database system in which partitioning is implemented, it becomes possible to store smaller data pieces in each database node. As a result, an access from a client can be distributed among a plurality of database nodes.

Sharding

There is one database technology called sharding. In sharding, data is divided into smaller pieces of data which are automatically distributed and stored in a plurality of database nodes. Thus, sharding is a similar technology to the partitioning technology implemented in a shared-nothing type database system.

Distributed Key-Value Type Database

Key-value type databases are known. A key-value type database is a database that is based on a simple data model made of pairs of keys and values in an identical manner to the associative arrays or Map of a programming language. Moreover, a distributed key-value type database is also known in which a key-value type database is distributed by performing sharding with the use of keys.

In a key-value type database, since the data model is simple in nature, it is easy to perform sharding and partitioning operations. Moreover, in a distributed key-value type database, a plurality of key-value type database nodes can be used to process large-scale data pieces which cannot be handled in a single key-value type database node. Hence, if a distributed key-value type database is implemented in a shared-nothing type database containing a plurality of database nodes, then it becomes possible to implement a large-scale database system having the scale-out capability.

Moreover, in a shared-nothing type database system in which a distributed key-value type database is implemented (hereinafter, called a scale-out type database system); if the data is placed in an equal manner in a plurality of database nodes, then an access from a client can be distributed so as to enhance the throughput and the response on the whole.

Meanwhile, in a scale-out type database system, a technology called replication is implemented in which a copy (replica) of the data is stored in other database nodes. In a scale-out type database system, as a result of performing replication, even if a failure occurs in a particular database node, the services can be continued using a database node in which the replica has been stored. The number of database nodes in which the replica of the data is stored is called redundancy. In a scale-out type database system, the redundancy is set to, for example, 2 or 3.

Herein, in a scale-out type database system, if a failure occurs in a database node, and if the database node in which a failure has occurred is separated off; then the redundancy decreases from the value which has been set in advance. However, if the scale-out type database system is kept running with a decreased redundancy for a long period of time, then any further database node failure is highly likely to cause the entire system to stop working or cause a wide range of data loss. For that reason, in a scale-out type database system, it is necessary to have a mechanism by which, after a failure occurs in a database node, a new database node is added and a data replica is stored in the added database node so as to restore the redundancy to the original.

Moreover, in a scale-out type database system, depending on the manner in which data is placed; there are times when the volume of stored data is not equal among the database nodes. Moreover, in a scale-out type database system, depending on the manner in which data is placed; there are times when the traffic from clients is not equal among the database nodes.

If such inequality in the placement of data grows large; then, in a scale-out type database system, the database nodes having a large volume of data or the database nodes that are accessed from clients take a relatively long period of time to perform operations. Since one of the merits of a scale-out type database system is to enable distribution of an access from a client, inequality in the placement of data results in losing that merit.

With the aim of solving the abovementioned issues of a decrease in the redundancy and inequality in the placement of data; in a scale-out type database system, at the point of time when inequality occurs in the placement of data, it is necessary to perform an operation of relocating the data among a plurality of database nodes.

However, in a conventional database system, such an operation of relocation needs to be performed with the services stopped. Moreover, in a conventional database system, the operation of relocating the data has an extremely high processing load. Hence, unless that operation is performed in an efficient manner, the processing efficiency undergoes a decline in a significant way.

BRIEF DESCRIPTION OF THE DRAWINGS

FIG. 3 is a diagram illustrating an example of a data retention table;

FIG. 4 is a diagram illustrating an example of a current-role table;

FIG. 5 is a diagram illustrating an example of a next-role table;

FIG. 6 is a diagram illustrating an example of a target-role table;

DETAILED DESCRIPTION

According to an embodiment, a database system includes a plurality of nodes in which a database is stored; and a management device configured to manage the plurality of nodes. The management device includes a first assigning unit and a second assigning unit. Depending on a change in state of each of the plurality of nodes, the first assigning unit assigns a first node, which stores therein data pieces and receives an access request with respect to the data pieces, and assign a second node, which stores therein the data pieces and serves as a backup node for the first node, and instructs each of the plurality of nodes to perform operations according to assignment. Depending on a state of the plurality of nodes and depending on a change in assignment state of the first node and the second node, the second assigning unit assigns a third node which is a candidate node to serve as the first node or the second node, and instructs each of the plurality of nodes to make preparation for causing the third node to operate as the first node or the second node. Each of the plurality of nodes includes a transferring unit configured to send the data pieces of the first node or the second node to the third node.

Figure 1:
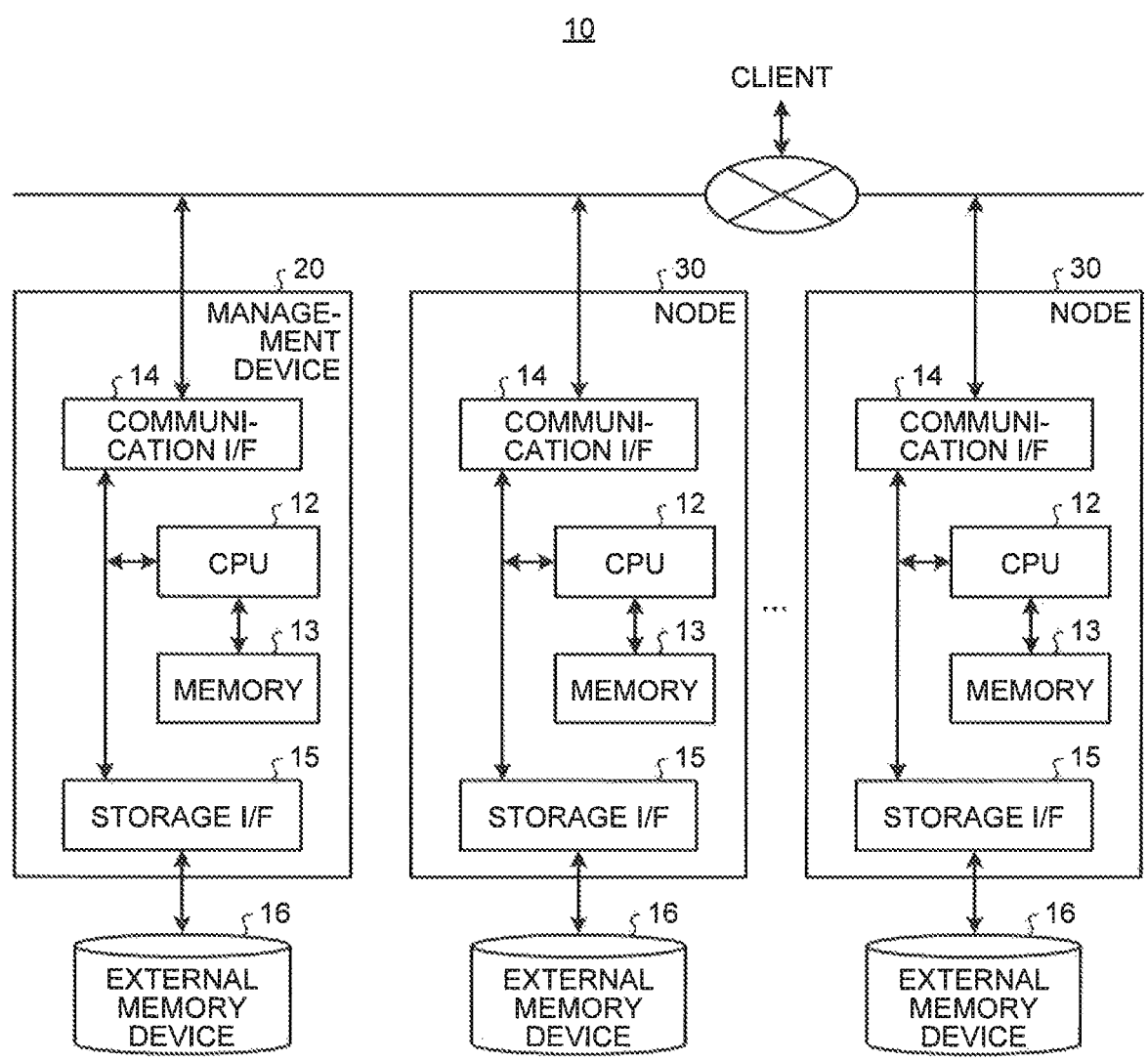
FIG. 1 is a diagram illustrating a hardware configuration of a database system according to an embodiment.

FIG. 1 is a diagram illustrating a hardware configuration of a database system 10 according to an embodiment. The database system 10 receives a database access request (such as a reference request, an update request, or a registration request) from a client that is an external computer via a network, and performs operations according to the received access request.

The database system 10 includes a management device 20 and a plurality of nodes 30. The management device 20 and a plurality of nodes 30 are connected to each other via a network. In FIG. 1, although only two nodes 30 are illustrated, the database system 10 can also include three or more nodes 30.

As an example, the database system 10 is a database system in which a distributed key-value type database is implemented in a shared-nothing type database and which has the scale-out capability. In this database system 10, although the data pieces are distributed to a plurality of nodes 30, the database system 10 is accessed as a single massive database by a client that is an external computer.

The management device 20 as well as each of a plurality of nodes 30 is a computer that is independent from each other as far as the hardware is concerned. Each of a plurality of nodes 30 independently receives an access request from a client, and is capable of independently performing operations according to the access request.

As an example, the management device 20 as well as each of a plurality of nodes 30 includes a CPU (Central Processing Unit) 12, a memory 13, a communication I/F 14, and a storage I/F 15. Moreover, the management device 20 as well as each of a plurality of nodes 30 is connected to an external memory device 16 via the corresponding storage I/F 15. Alternatively, the external memory device 16 can also be installed inside the nodes 30.

In the database system 10, a database is stored so as to be partitioned into a plurality of partitions. The number of partitions is set in advance. Regarding the method of partitioning, any method can be implemented as long as it is determined in advance.

With respect to each of a plurality of partitions, each of a plurality of nodes 30 is assigned either to serve as an owner node, or to serve as a backup node, or neither to serve as an owner node nor to serve as a backup node.

An owner node stores therein the data pieces present in the corresponding partitions; and receives access requests from clients with respect to the data pieces of the corresponding partitions and processes the access requests. A backup node stores therein the data pieces present in the corresponding partitions; and, for example, if a failure occurs in the owner node, backs the owner node up by taking over the role of the owner node. Meanwhile, instead of the terminology such as owner nodes and backup nodes, there are times when the terminology such as master nodes and slave nodes is also used.

The management device 20 manages a plurality of nodes 30. As an example, with respect to each of a plurality of partitions, the management device 20 assigns the node 30 that would serve as the owner node and assigns the node 30 that would serve as the backup node.

In this case, regarding the nodes 30 assigned to serve as the backup nodes, the management device 20 does the assignment in such a way that the redundancy is maintained within a predetermined range. With that, even if a failure occurs in any node 30, the database can be restored to the original to the extent possible. Moreover, regarding the nodes 30 assigned to serve as the owner nodes and the nodes 30 assigned to serve as the backup nodes, the management device 20 does the assignment in such a way that the data pieces included in the database are placed in a plurality of nodes 30 in a distributed manner.

Meanwhile, the management device 20 can also be configured in any one of the nodes 30. Alternatively, the node 30 that would function as the management device 20 may be selected according to an arbitrary algorithm. In case a failure occurs in the node 30 functioning as the management device 20, another node 30 may function as the management device 20.

In the database system 10, if a failure occurs in any one of a plurality of nodes 30, it becomes possible to separate off the node 30 in which a failure has occurred. Besides, in the database system 10, it is possible to newly add the nodes 30 and enhance the database performance.

Figure 2:
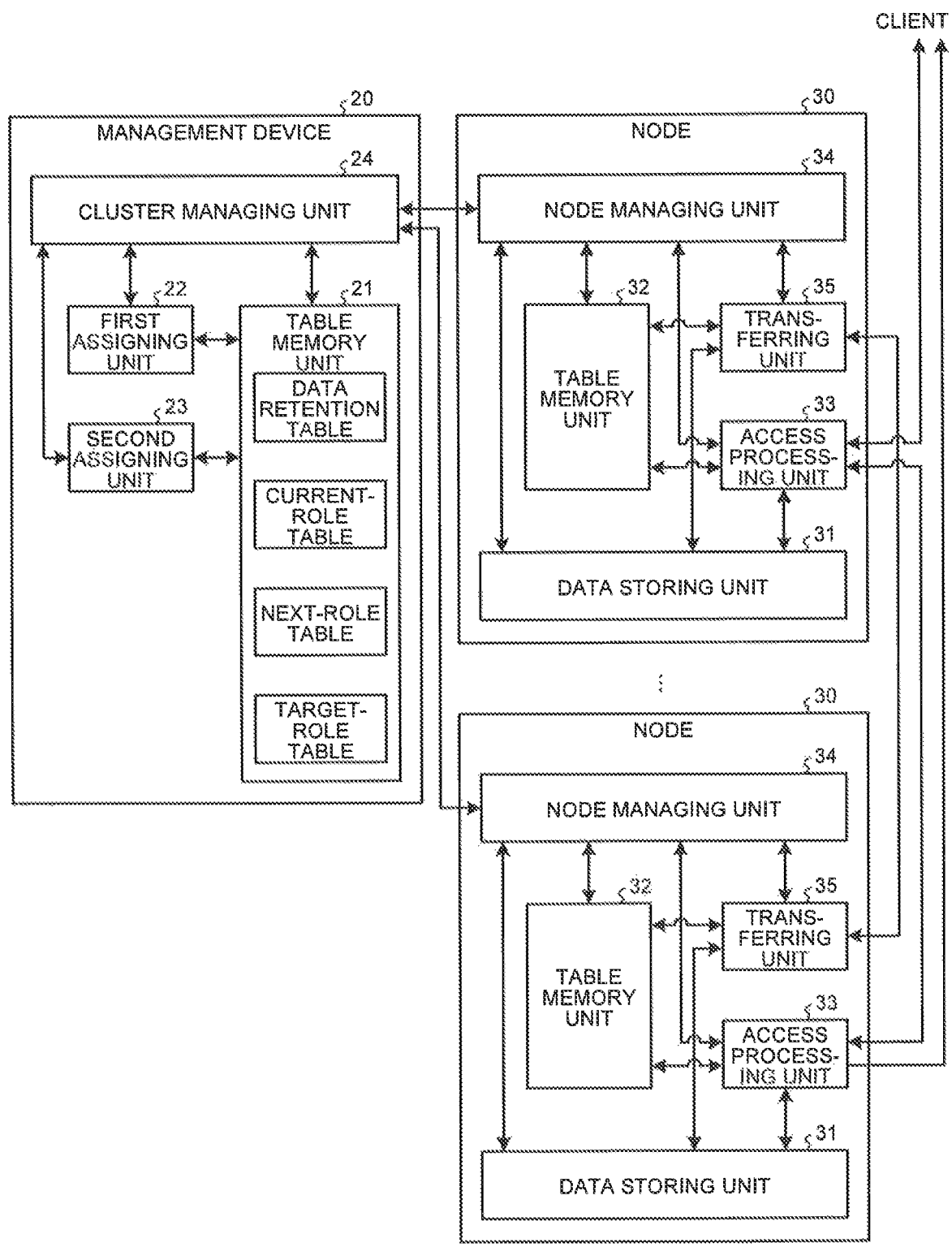
FIG. 2 is a diagram illustrating a functional configuration of the database system according to the embodiment.

FIG. 2 is a diagram illustrating a functional configuration of the database system 10 according to the embodiment.

The management device 20 includes a table memory unit 21, a first assigning unit 22, a second assigning unit 23, and a cluster managing unit 24. The first assigning unit 22, the second assigning unit 23, and the cluster managing unit 24 are implemented when the CPU 12 of the management device 20 runs programs. Alternatively, the first assigning unit 22, the second assigning unit 23, and the cluster managing unit 24 can be implemented either partially or entirely using hardware circuitry. The table memory unit 21 is implemented using the memory 13 of the management device 20 or using the external memory device 16.

The table memory unit 21 is used to store four tables that are created for the purpose of deciding the role of each of a plurality of nodes 30 with respect to each of a plurality of partitions. Each of the four tables can be data in the table form or can be data in a form other than the table form.

More particularly, the table memory unit 21 is used to store a data retention table, a current-role table, a next-role table, and a target-role table.

The data retention table is used to store the time stamp of each of a plurality of nodes 30 with respect to each of a plurality of partitions. A time stamp represents the update history about the data pieces in corresponding partitions stored in a corresponding node 30. As an example, a time stamp is a value that is incremented after every instance of updating the corresponding data pieces. Thus, the node 30 having the largest time stamp with respect to a particular partition represents the node 30 that stores therein the latest data pieces with respect to the particular partition.

Meanwhile, in the case when the size of the database increases with time; then, instead of storing the time stamps, the data retention table may store the size or the data count about the data pieces in the corresponding partitions stored in the corresponding node 30.

As an example, as illustrated in FIG. 3, in the data retention table, the nodes 30 are identified by rows, while the partitions are identified by columns. In this case, in the data retention table, in each cell having an intersection between a row and a column is specified the time stamp which is stored in the node 30 identified by that row and which is of the data pieces of the partition identified by that column.

The current-role table stores therein the assigned role in the database for each of a plurality of nodes 30 with respect to each of a plurality of partitions. More particularly, the current-role table specifies, with respect to each of a plurality of partitions, whether each of a plurality of nodes 30 is assigned either to serve as an owner node, or to serve as a backup node, or neither to serve as an owner node nor to serve as a backup node.

As an example, as illustrated in FIG. 4, in the current-role table, the nodes 30 are identified by rows, while the partitions are identified by columns. In this case, in the current-role table, in each cell having an intersection between a row and a column is specified the role assigned to the node 30 identified by that row and assigned with respect to the partition identified by that column. In the drawings, the case in which a node is assigned to serve as an owner node is illustrated as "OWNER" or "O"; the case in which a node is assigned to serve as a backup node is illustrated as "BACKUP" or "B"; and the case in which a node is neither assigned to serve as an owner node nor assigned to serve as a backup node is illustrated as "NONE" or "N" or a blank space.

The next-role table stores therein the next role assigned to each of a plurality of nodes 30 with respect to each of a plurality of partitions. Thus, the next-role table specifies, with respect to each of a plurality of partitions, whether each of a plurality of nodes 30 is next assigned either to serve as an owner node, or to serve as a backup node, or neither to serve as an owner node nor to serve as a backup node. For example, when a failure occurs in a node 30 or when a new node 30 is added, then the current-role table is replaced with the next-role table.

As an example, as illustrated in FIG. 5, in the next-role table, the nodes 30 are identified by rows, while the partitions are identified by columns. In this case, the next-role table stores, in each cell having an intersection between a row and a column, the next role assigned to the node 30 identified by the row with respect to the partition identified by that column.

The target-role table stores therein an assigned role of a backup candidate node assigned to each of a plurality of nodes 30 with respect to each of a plurality of partitions. A backup candidate has a role to make preparations for serving as an owner node or a backup node in future with respect to a partition. In the explanation of the present embodiment, although this particular role is named as "backup candidate", the node assigned to serve as a backup candidate node can also serve as an owner node in future.

As an example, as illustrated in FIG. 6, in the target-role table, the nodes 30 are identified by rows, while the partitions are identified by columns. In this case, the target-role table stores, in each cell having an intersection between a row and a column, the role of a backup candidate node assigned to the node 30 identified by the row and assigned with respect to the partition identified by the column. In the drawings, the case in which a node is assigned to serve as a backup candidate node is illustrated as "MID-BACKUP" or "M"; and the case in which a node is not assigned to serve as a backup candidate node is illustrated as a blank space.

The first assigning unit 22 assigns, with respect to each of a plurality of partitions, the node 30 that would serve as the owner node and the node 30 that would serve as the backup node depending on the state of each of a plurality of nodes 30. Moreover, for example, if a failure occurs in any one node 30 of a plurality of nodes 30; then, with the exclusion of the node 30 in which a failure has occurred, the first assigning unit 22 reassigns the nodes 30 that would serve as the owner nodes and the nodes 30 that would serve as the backup nodes.

Furthermore, if a new node 30 is added; then, while including the newly added node 30, the first assigning unit 22 reassigns, with respect to each of a plurality of partitions, the node 30 that would serve as the owner node and the node 30 that would serve as the backup node. Moreover, in the case in which, due to the completion of sending the data pieces to a node 30 that is assigned to serve as a backup candidate node, the node 30 becomes newly available to serve as an owner node or a backup node; the first assigning unit 22 reassigns, with respect to each of a plurality of partitions, the node 30 that would serve as the owner node and the node 30 that would serve as the backup node.

Herein, regarding the nodes 30 assigned to serve as the owner nodes and the nodes 30 assigned to serve as the backup nodes, the first assigning unit 22 does the assignment with respect to all of a plurality of partitions in such a way that at least the owner nodes are present. With that, the first assigning unit 22 can at least make the database work.

Moreover, subject to at least making the database work, the first assigning unit 22 assigns, with respect to each of a plurality of partitions, the node 30 that would serve as the owner node and the node 30 that would serve as the backup node in such a way that the redundancy within a predetermined range is achieved. With that, even if a failure occurs in any one of the nodes 30, the first assigning unit 22 can increase the likelihood of at least making the database work.

Moreover, subject to at least making the database work as well as subject to achieving the redundancy within a predetermined range, the first assigning unit 22 assigns, with respect to each of a plurality of partitions, the node 30 that would serve as the owner node and the node 30 that would serve as the backup node in such a way that the owner nodes and the backup nodes are assigned in a distributed manner among a plurality of nodes 30. With that, the first assigning unit 22 can even out the processing load of each of a plurality of nodes 30.

Meanwhile, in the present example, in order to assign the nodes 30 that would serve as the owner nodes and the nodes 30 that would serve as the backup nodes, the first assigning unit 22 calculates the next-role table. Regarding an example of the method by which the first assigning unit 22 calculates the next-role table, the explanation is given later with reference to FIG. 13.

The second assigning unit 23 assigns, with respect to each of a plurality of partitions, the node 30 that would serve as the backup candidate node depending on the state of a plurality of nodes 30 and depending on the changes in the assignment state of the owner nodes and the backup nodes assigned according to the current-role table.

Moreover, for example, if a failure occurs in any one node 30 of a plurality of nodes 30; then, with the exclusion of the node 30 in which a failure has occurred, the second assigning unit 23 reassigns the nodes 30 that would serve as the backup candidate nodes. Furthermore, if a new node 30 is added; then, while including the newly added node 30, the second assigning unit 23 reassigns, with respect to each of a plurality of partitions, the nodes 30 that would serve as the backup candidate nodes.

Herein, with respect to each of a plurality of partitions, the second assigning unit 23 assigns the node 30 that would serve as the backup candidate node in such a way that the redundancy within a predetermined range is achieved in future. With that, even if a failure occurs in any one node 30 in future, the second assigning unit 23 can increase the likelihood of at least making the database work.

Moreover, with respect to each of a plurality of partitions, the second assigning unit 23 assigns the node 30 that would serve as the backup candidate node in such a way that future assignment of the owner nodes and the backup nodes is done in a distributed manner among a plurality of nodes 30. With that, the second assigning unit 23 can even out the processing load of each of a plurality of nodes 30 in future.

the nodes 30 that would serve as the backup candidate nodes, the second assigning unit 23 calculates the target-role table. Regarding an example of the method by which the second assigning unit 23 calculates the target-role table, the explanation is given later with reference to FIG. 14.

The cluster managing unit 24 communicates messages with each of a plurality of nodes 30 via a network, and manages each of a plurality of nodes 30. For example, at regular time intervals, the cluster managing unit 24 communicates a message called heartbeat to each of a plurality of nodes 30. Then, depending on whether or not a response to the heartbeat is received, the cluster managing unit 24 identifies the node 30 in which a failure has occurred.

Moreover, at regular intervals, the cluster managing unit 24 receives the data retention table from each of a plurality of nodes 30. Then, the cluster managing unit 24 stores, in the table memory unit 21, the data retention tables received from all of the nodes 30. Furthermore, depending on whether or not the data retention table is received, the cluster managing unit 24 identifies the node 30 in which a failure has occurred.

Moreover, at the time of startup, the cluster managing unit 24 causes the first assigning unit 22 to calculate the next-role table and distributes the calculated next-role table to each of a plurality of nodes 30, to thereby instruct each of a plurality of nodes 30 to perform operations according to the assignment. The cluster managing unit 24 causes the first assigning unit 22 on a periodic basis to calculate the next-role table. In the case when the calculated next-role table changes from the current-role table, the cluster managing unit 24 distributes the calculated next-role table to each of a plurality of nodes 30 to thereby instruct each of a plurality of nodes 30 to perform operations according to the assignment. Once the next-role table is distributed; the cluster managing unit 24 updates the current-role table, which is stored in the table memory unit 21, with the contents of the next-role table.

For example, if a failure occurs in any one node 30, or if a new node 30 is added, or if sending of the data pieces to a node 30 that is assigned to serve as a backup candidate node is completed and that node 30 becomes newly available for assignment as a backup node; then the calculated next-role table changes from the current-role table. Accordingly, in such a case, the cluster managing unit 24 distributes the next-role table to each of a plurality of nodes 30.

Meanwhile, the cluster managing unit 24 causes the second assigning unit 23 on a periodic basis to calculate the target-role table and distributes the calculated target-role table to each of a plurality of nodes 30. By distributing the target-role table, the cluster managing unit 24 instructs each of the nodes 30 to make preparations for causing the node 30 assigned to serve as the backup candidate node to operate as the owner nodes or the backup nodes. Meanwhile, the cluster managing unit 24 instructs calculation of the next-role table and calculation of the target-role table at different cycles.

Each of a plurality of nodes 30 includes a data storing unit 31, a table memory unit 32, an access processing unit 33, a node managing unit 34, and a transferring unit 35. The access processing unit 33, the node managing unit 34, and the transferring unit 35 are implemented when the CPU 12 of the corresponding node 30 runs programs. Alternatively, the access processing unit 33, the node managing unit 34, and the transferring unit 35 can be implemented either partially or entirely using hardware circuitry. The data storing unit 31 and the table memory unit 32 are implemented using the memory 13 of the corresponding node 30 or the external memory device 16.

Figure 7:
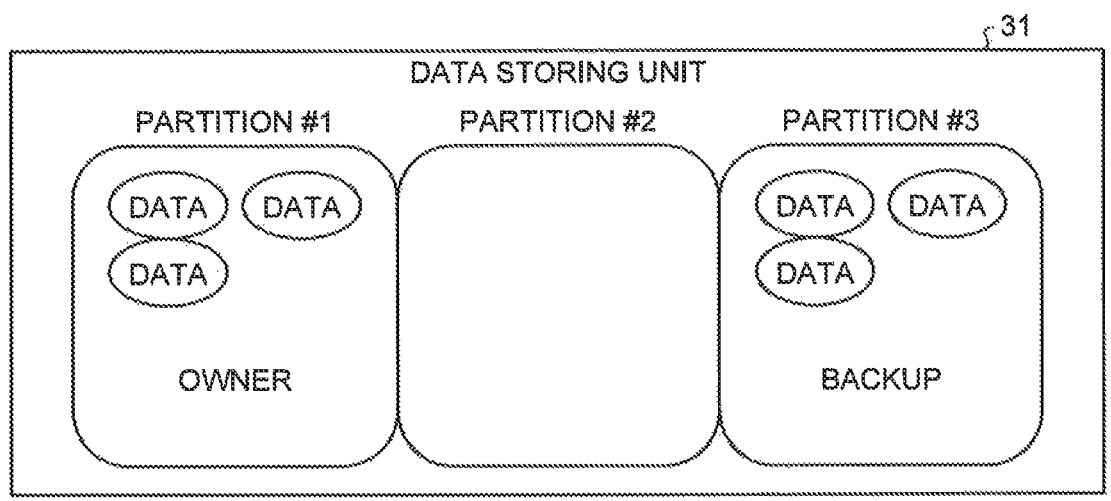
FIG. 7 is a diagram illustrating an example of data pieces stored in a data storing unit.

The data storing unit 31 is used to store the data pieces of the partitions, from among a plurality of partitions obtained by partitioning the database, with respect to which the node is assigned to serve as the owner node or the backup node. For example, as illustrated in FIG. 7, from among three partitions #1 to #3 obtained by partitioning the database, assume that the concerned node is assigned to serve as the owner node with respect to the partition #1 and assigned to serve as the backup node with respect to the partition #3. In this case, the corresponding data storing unit 31 stores the data pieces of the partition #1 and the data pieces of the partition #3.

Regarding a partition for which a node 30 is assigned to serve as the backup candidate node according to the target-role table, that node 30 receives the data pieces from another node 30 which is assigned to serve as the owner node with respect to the partition. Regarding the data pieces present in a partition for which the concerned node is assigned to serve as the backup candidate node according to the target-role table, the corresponding data storing unit 31 stores therein some or all of the data that is already received from the node 30 serving as the owner node with respect to the partition.

The table memory unit 32 is used to store the portion in the data retention table which corresponds to the corresponding node. Besides, the table memory unit 32 is used to store the current-role table, the next-role table, and the target-role table. Regarding the current-role table; when the next-role table is received, the current-role table is replaced with the next-role table. Regarding the target-role table; when there is a change in the target-role table received on a periodic basis, it is rewritten with the changed contents.

The access processing unit 33 receives an access request from a client via a network. Then, with respect to each of a plurality of partitions, the access processing unit 33 performs operations according to the role assigned to the corresponding node in the current-role table.

More particularly, the access processing unit 33 receives from a client an access request with respect to the partition for which the corresponding node is assigned to serve as the owner node; and performs operations according to that access request. As an example, when a reference request is received, the access processing unit 33 reads the corresponding data from the data pieces in the partition, and sends the read data to the client. Moreover, as an example, when an update request is received, the access processing unit 33 updates the corresponding data in the data pieces in the partition. Furthermore, as an example, when a registration request is received, the access processing unit 33 registers new data in the data pieces in the partition.

Meanwhile, the access processing unit 33 can also receive a transaction that contains a sequence of access requests. In that case, the access processing unit 33 performs transaction processing to process the sequence of access requests received from a client.

Moreover, when an update request or a registration request is processed, the access processing unit 33 performs a replication operation with the node 30 that is assigned in the current-role table to serve as the backup node with respect to the concerned partition. A replication operation points to an operation of generating, in the node 30 that is assigned to serve as the backup node, a replica of the data pieces stored in the node 30 that is assigned to serve as the owner node.

Figure 8:
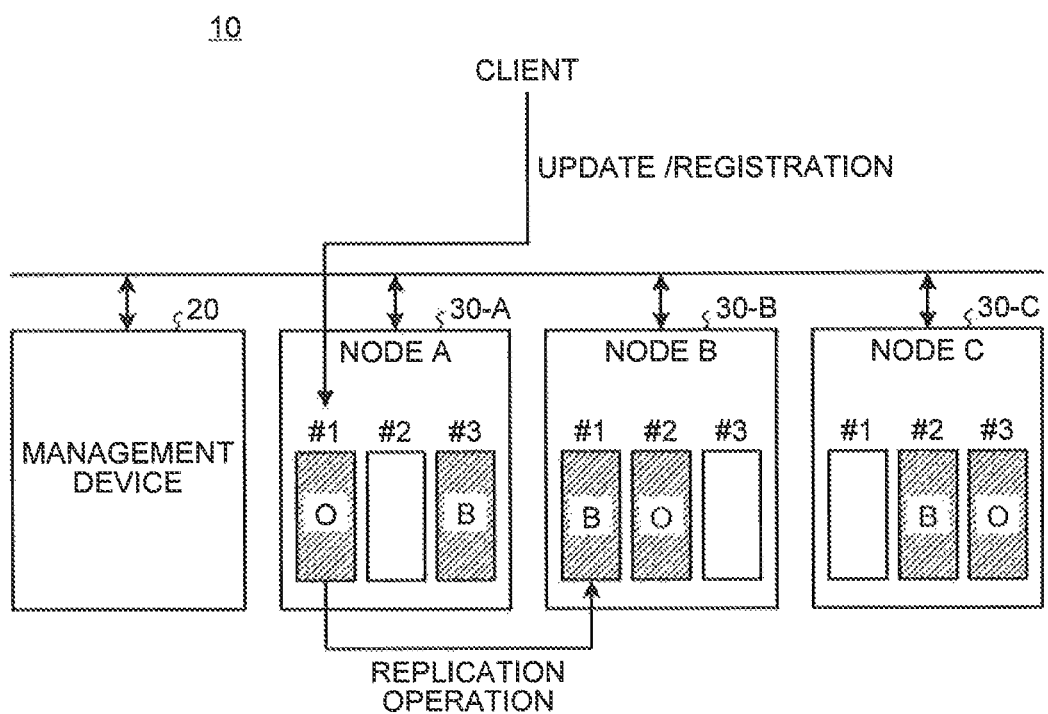
FIG. 8 is a diagram for explaining a replication application.

More particularly, as illustrated in FIG. 8, when an update request or a registration request is received with respect to a partition for which the corresponding node is assigned to serve as the owner node, the access processing unit 33 sends an identical access request to another node 30 that is assigned to serve as the backup node. Then, the access processing unit 33 of the other node 30 receives, from the node 30 assigned to serve as the owner node, an update request or a registration request with respect to the partition for which the corresponding node 30 is assigned to serve as the backup node; and performs an update operation or a registration operation according to the received request.

By performing such a replication operation, the access processing unit 33 can achieve synchronization of data pieces between the node 30 assigned to serve as the owner node and the node 30 assigned to serve as the backup node.

In the case in which the replication operation is performed by the access processing unit 33 of the node 30 that is assigned to serve as the owner node, the access processing unit 33 can also send the transaction that contains a sequence of access requests. In this case, in the node 30 that is assigned to serve as the backup node, the access processing unit 33 performs a replication operation by means of transaction processing.

Meanwhile, when an update request or a registration request is processed, the access processing unit 33 updates the time stamp of the corresponding partition in the data retention table that is stored in the table memory unit 32.

The node managing unit 34 communicates messages with the cluster managing unit 24 of the management device 20 via a network. Upon receiving a message called heartbeat from the cluster managing unit 24, the node managing unit 34 sends back a response message in case a failure has occurred in the corresponding node. Moreover, the node managing unit 34 sends the data retention table, which is stored in the table memory unit 32, to the cluster managing unit 24 on a periodic basis.

Figure 9:
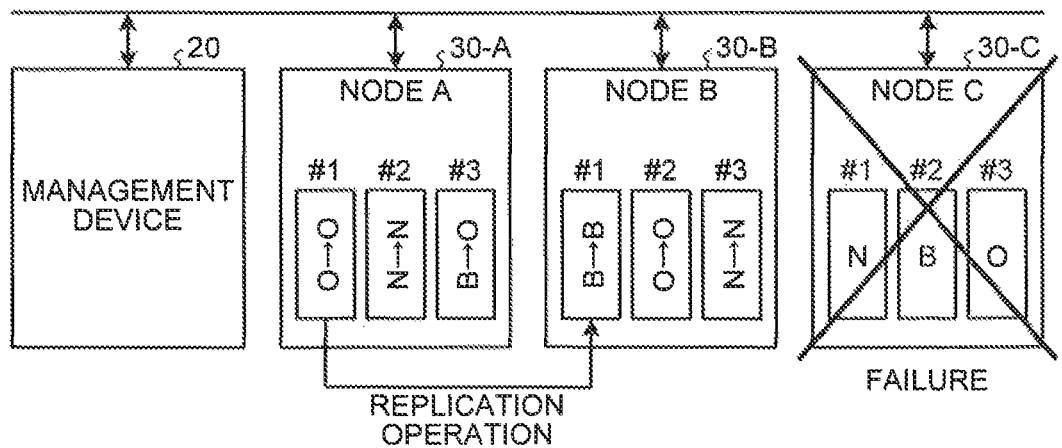
FIG. 9 is a diagram for explaining short-term synchronization processing.

Furthermore, the node managing unit 34 receives the next-role table from the cluster managing unit 24, and stores the next-role table in the table memory unit 32. Herein, upon receiving the next-role table, as illustrated in FIG. 9, the node managing unit 34 performs short-term synchronization processing that is a synchronization processing in which the operations being performed according to the access request received from a client are temporarily discontinued for the purpose of making each of a plurality of nodes 30 operate according to the role assigned in the next-role table.

More particularly, with respect to each of a plurality of partitions, the node managing unit 34 causes the access processing unit 33 to perform an identical operation to the replication operation for the purpose of making each of a plurality of nodes 30 operate according to the role assigned in the next-role table. As a result, with respect to each of a plurality of partitions, the node managing unit 34 can achieve synchronization of data pieces between the node 30 assigned to serve as the owner node and the node assigned to serve as the backup node. Upon achieving synchronization of data pieces, the node managing unit 34 causes the access processing unit 33 to rewrite the current-role table with the contents of the next-role table and to perform operations with respect to each of a plurality of partitions according to the new roles assigned in the next-role table.

Once the short-term synchronization processing is completed, the node managing unit 34 updates the contents of the current-role table with the contents of the next-role table. After that, the access processing unit 33 can receive an access request from a client.

The node managing unit 34 receives the target-role table from the cluster managing unit 24 on a periodic basis, and stores that target-role table in the table memory unit 32.

Figure 10:
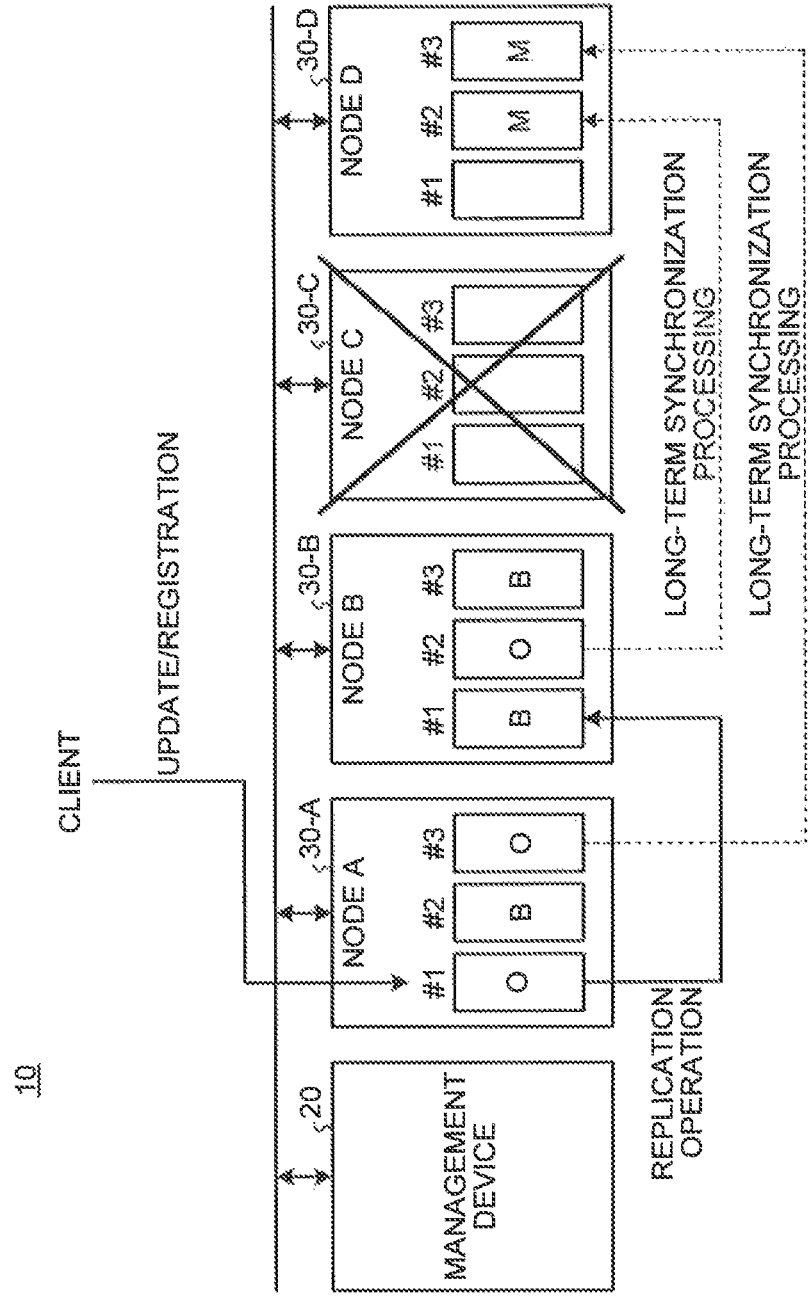
FIG. 10 is a diagram for explaining long-term synchronization processing.

As illustrated in FIG. 10, the transferring unit 35 performs long-term synchronization processing that is a synchronization processing for the purpose of making each of a plurality of nodes 30 operate in the role assigned in the next-role table without discontinuing the operations being performed according to the access request received from a client. More particularly, the transferring unit 35 sends, without discontinuing the operations being performed according to the access request, the data pieces of the partition, for which the corresponding node is assigned to serve as the owner node according to the current-role table, to the other node 30 that is assigned to serve as the backup candidate node according to the target-role table and that is neither assigned to serve as the owner node nor assigned to serve as the backup node. Moreover, the transferring unit 35 sends, without discontinuing the operations being performed according to the access request, the data pieces of the partition, for which the corresponding node is assigned to serve as the backup candidate node according to the target-role table and for which the corresponding node is neither assigned to serve as the owner node nor assigned to serve as the backup node according to the current-role table, from the other node 30 that is assigned to serve as the owner node according to the current-role table.

By performing such long-term synchronization processing, a replica of the data pieces, which are stored in the node 30 that is assigned to serve as the owner node, can be stored by the transferring unit 35 in the node 30 that is not assigned to serve as the owner node or the backup node. As a result, upon the completion of the long-term synchronization processing, the transferring unit 35 can newly generate a node 30 that can serve as the owner node or the backup node.

In the case of performing long-term synchronization processing, the transferring unit 35 sends, in the background while not interrupting the transaction execution by the access processing unit 33, the data pieces of the partition for which the corresponding node is assigned to serve as the owner node to the node 30 that is assigned to serve as the backup candidate node. Moreover, the transferring unit 35 receives, in the background, the data pieces of the partition for which the corresponding node is assigned to serve as the backup candidate node from the node 30 that is assigned to serve as the owner node. Herein, regarding an operation performed in the background; as an example, when the node 30 includes a plurality of CPUs 12, an operation performed using some of the CPUs 12 not performing the transaction operation represents an operation performed in the background. Alternatively, regarding an operation performed in the background; as an example, when the CPU 12 performs operations in a time-shared manner, an operation performed in some of the time slots in which the CPU 12 does not perform the transaction operation represents an operation performed in the background. With that, the transferring unit 35 becomes able to perform long-term synchronization processing without causing a decrease in the response speed with respect to an access request from a client.

Meanwhile, regarding the data pieces of the partition for which the corresponding node is assigned to serve as the backup node according to the current-role table, the transferring unit 35 can send those data pieces to the other node 30 that is assigned to serve as the backup candidate node according to the target-role table and that is neither assigned to serve as the owner node nor assigned to serve as the backup node according to the target-role table. In this case, the transferring unit 35 performs operations conditional upon the fact that the same data pieces have not been sent from another node 30.

Figure 11:
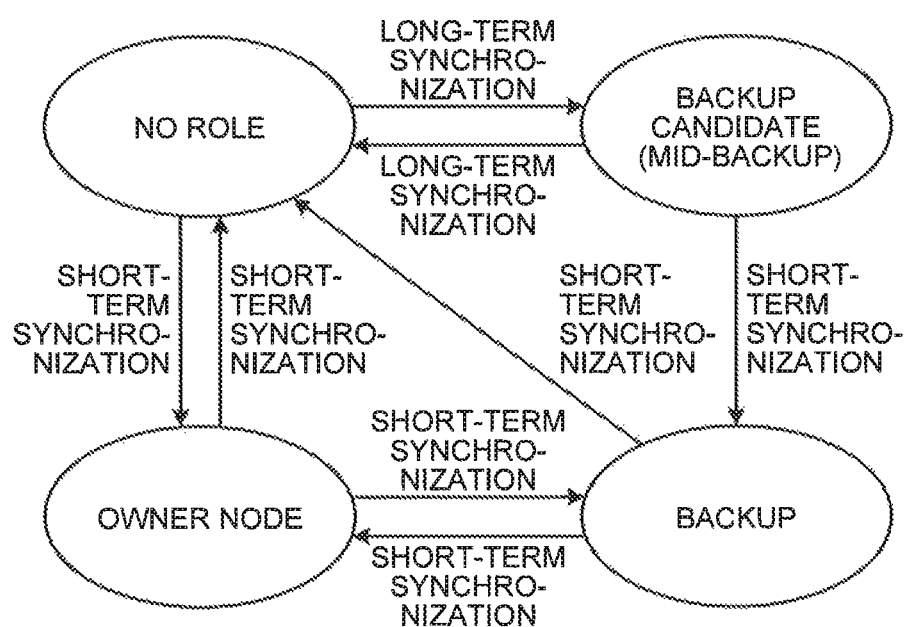
FIG. 11 is a diagram illustrating a transition in the roles assigned to nodes.

FIG. 11 is a diagram illustrating a transition in the roles assigned to the nodes 30. With respect to each of a plurality of partitions, the nodes 30 make transition between the state of being assigned to serve as the "owner node", or the state of being assigned to serve as the "backup node", or the state of being assigned to serve as the "backup candidate node", or the state of being assigned "no role".

A node 30 makes mutual transition between the state of being assigned "no role" and the state of being assigned to serve as the "owner node" as a result of short-term synchronization processing. Similarly, a node 30 makes mutual transition between the state of being assigned to serve as the "owner node" and the state of being assigned to serve as the "backup node" as a result of short-term synchronization processing. Moreover, a node 30 makes mutual transition between the state of being assigned to serve as the "backup node" and the state of being assigned "no role" as a result of short-term synchronization processing.

Furthermore, a node 30 makes mutual transition between the state of being assigned "no role" and the state of being assigned to serve as the "backup candidate node" as a result of long-term synchronization processing. Besides, a node 30 makes transition from the state of being assigned to serve as the "backup candidate node" to the state of being assigned to serve as the "backup node" as a result of short-term synchronization processing.

Figure 12:
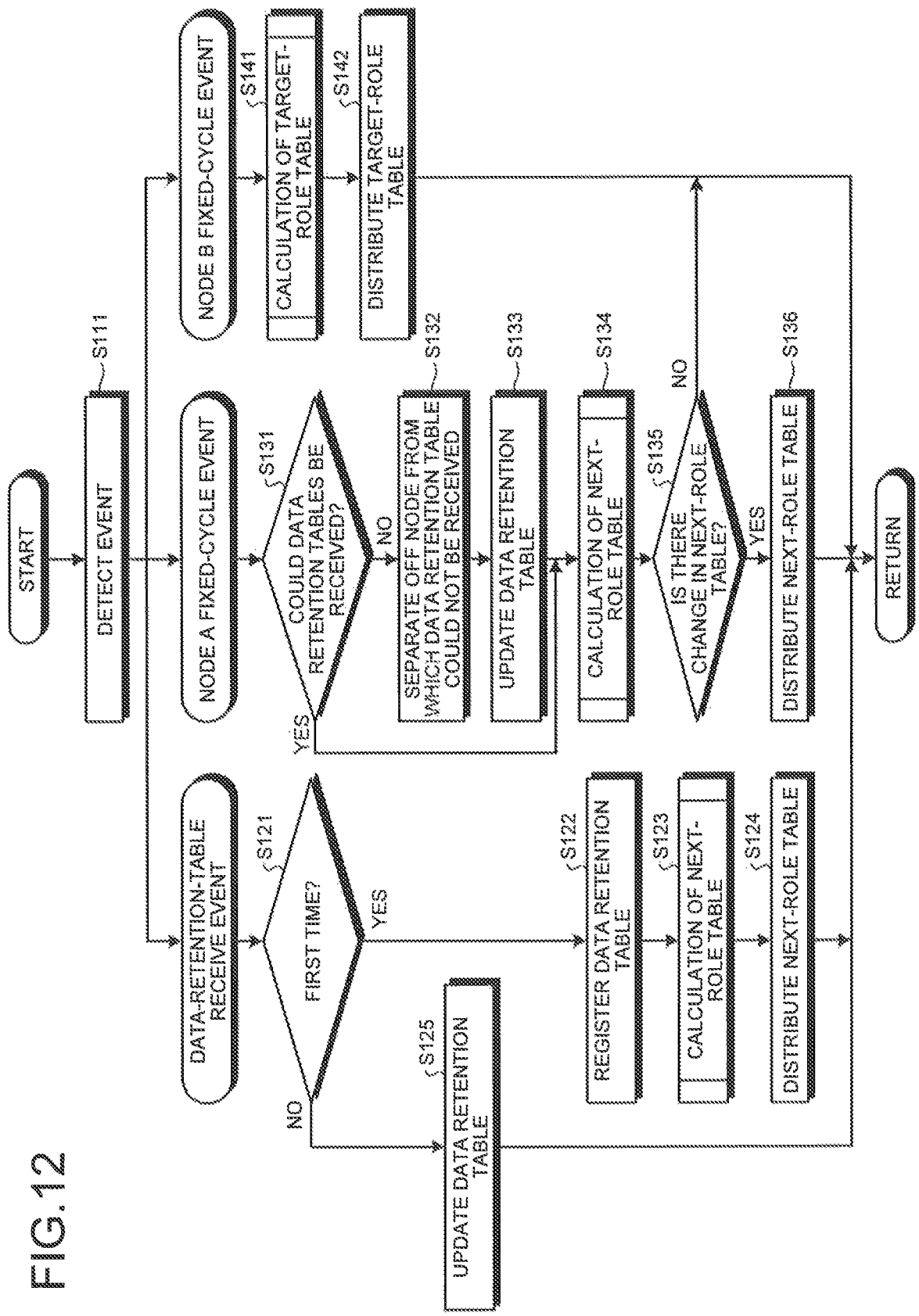
FIG. 12 is a diagram illustrating an operation flowchart of a cluster managing unit of a management device.

FIG. 12 is a diagram illustrating an operation flowchart of the cluster managing unit 24 of the management device 20. The cluster managing unit 24 performs operations from Step S111 to Step S142 explained below.

Firstly, at Step S111, the cluster managing unit 24 detects a data-retention-table receive event, a first fixed-cycle event, or a second fixed-cycle event. A data-retention-table receive event occurs when the cluster managing unit 24 receives the data retention table sent by each of a plurality of nodes 30. A first fixed-cycle event as well as a second fixed-cycle event occurs on a periodic basis. However, the interval of occurrence of the first fixed-cycle events is different from the interval of occurrence of the second fixed-cycle events.

When a data-retention-table receive event is detected, the cluster managing unit 24 proceeds to the operation at Step S121. When a first fixed-cycle event is detected, the cluster managing unit 24 proceeds to the operation at Step S131. When a second fixed-cycle event is detected, the cluster managing unit 24 proceeds to the operation at Step S141.

When a data-retention-table receive event is detected; at Step S121, the cluster managing unit 24 determines whether or not a data-retention-table receive event has occurred for the first time since the startup.

If the data-retention-table receive event has occurred for the first time since the startup (Yes at Step S121), then the cluster managing unit 24 proceeds to the operation at Step S122. At Step S122, the cluster managing unit 24 registers the received data retention table in the table memory unit 21.

Then, at Step S123, the cluster managing unit 24 causes the first assigning unit 22 to calculate the next-role table. The operation by which the first assigning unit 22 calculates the next-role table is explained with reference to FIG. 13.

Subsequently, at Step S124, the cluster managing unit 24 distributes the next-role table to each of a plurality of nodes 30. Once the operation at Step S124 is completed, the cluster managing unit 24 returns to the operation at Step S111.

Meanwhile, if it is not the first time since the startup that the data-retention-table receive event has occurred (No at Step S121); then, at Step S125, the cluster managing unit 24 updates the data retention table stored in the table memory unit 21. Once the operation at Step S125 is completed, the cluster managing unit 24 returns to the operation at Step S111.

Meanwhile, if a first fixed-cycle event is detected; then, at Step S131, the cluster managing unit 24 determines whether or not, during the period between the previous first fixed-cycle event and the current first fixed-cycle event, the data retention table is received from each of a plurality of nodes 30. If the data retention table is received from each of a plurality of nodes 30 (Yes at Step S131), then the cluster managing unit 24 proceeds to the operation at Step S134. However, if the data retention table is not received from any one node 30 (No at Step S131), then the cluster managing unit 24 proceeds to the operation at Step S132.

At Step S132, the cluster managing unit 24 performs an operation to separate off the node 30, from which the data retention table could not be received, from the database system 10. Then, at Step S133, the cluster managing unit 24 updates the data retention table by deleting the contents of the separated node 30 from the data retention table. Once the operation at Step S133 is completed, the cluster managing unit 24 proceeds to the operation Step S134.

At Step S134, the cluster managing unit 24 causes the first assigning unit 22 to calculate the next-role table. Regarding the operations by which the first assigning unit 22 calculates the next-role table, the explanation is given later with reference to FIG. 13.

Subsequently, at Step S135, the cluster managing unit 24 determines whether or not there is a change in the next-role table. For example, when a node 30 in which a failure has occurred is separated off, or when a new node 30 is added, or when long-term synchronization processing is completed and there is a change in the node 30 assigned to serve as the backup node; the next-role table undergoes a change.

If the next-role table has not changed (No at Step S135), then the cluster managing unit 24 returns to the operation at Step S111. However, when there is a change in the next-role table (Yes at Step S135); then, at Step S136, the cluster managing unit 24 distributes the changed next-role table to each of a plurality of nodes 30. Once the operation at Step S136 is completed, the cluster managing unit 24 returns to the operation at Step S111.

Meanwhile, when a second fixed-cycle event is detected; then, at Step S141, the cluster managing unit 24 causes the second assigning unit 23 to calculate the target-role table. Regarding the operations by which the second assigning unit 23 calculates the target-role table, the explanation is given later with reference to FIG. 14.

Subsequently, at Step S142, the cluster managing unit 24 distributes the calculated target-role table to each of a plurality of nodes 30. Once the operation at Step S142 is completed, the cluster managing unit 24 returns to the operation at S111.

Figure 13:
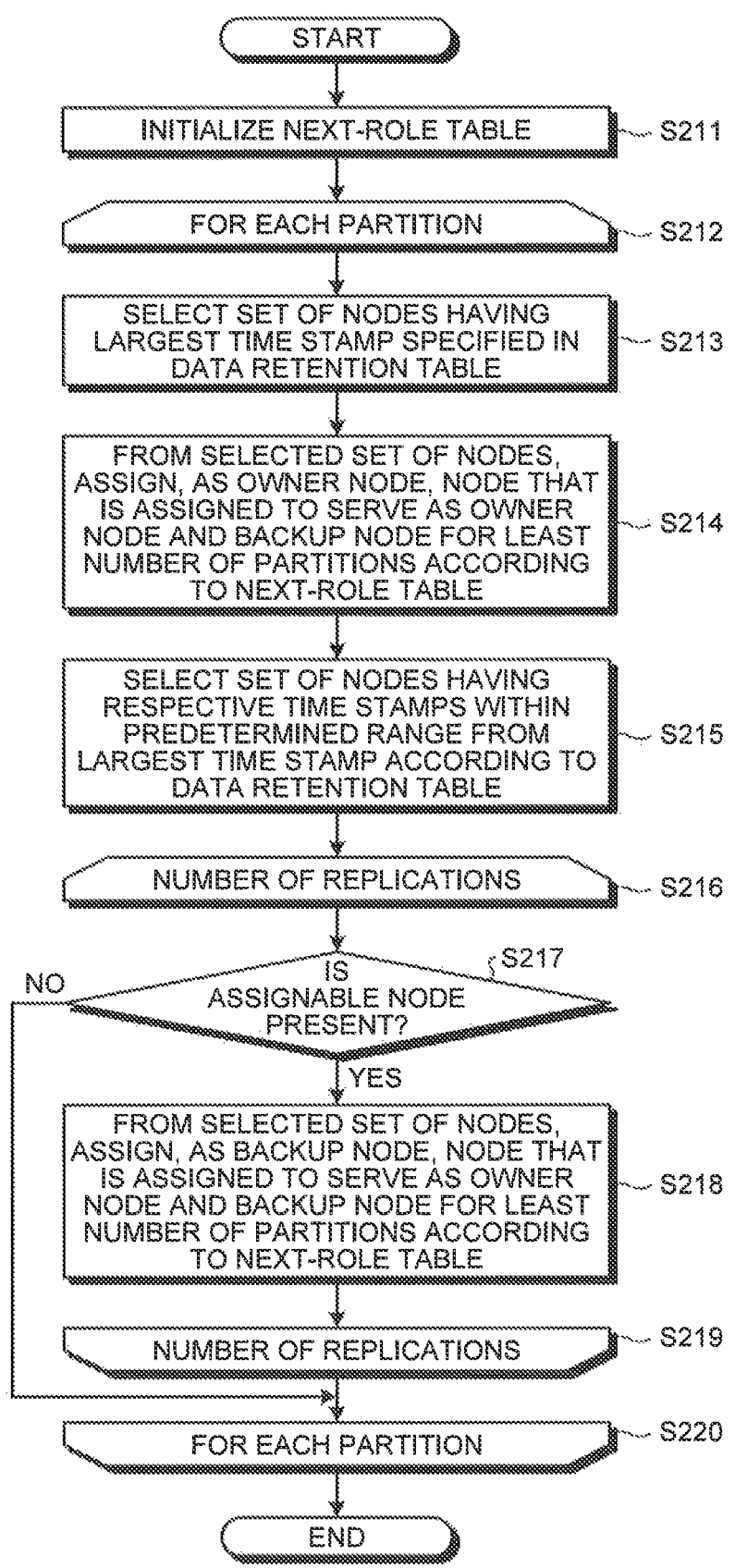
FIG. 13 is a flowchart for explaining the operations by which a first assigning unit of the management device calculates the next-role table.

FIG. 13 is a flowchart for explaining the operations by which the first assigning unit 22 of the management device 20 calculates the next-role table. The first assigning unit 22 is called by the cluster managing unit 24 at Step S123 and Step S134 illustrated in FIG. 12, and performs the operations from Step S211 to Step S220 explained below.

Firstly, at Step S211, the first assigning unit 22 initializes the next-role table. At that time, the first assigning unit 22 associates each of a plurality of nodes 30 specified in the next-role table with the nodes 30 specified in the data retention table. With that, in the next-role table, the first assigning unit 22 can reflect the node 30 that has been separated off due to a failure and the node 30 that has been newly added.

Then, from Step S212 to Step S220, the first assigning unit 22 performs a loop operation on a partition-by-partition basis. For example, if the database is partitioned into a first partition to a third partition, then the first assigning unit 22 performs the operations from Step S212 to Step S220 with respect to each of the first partition, the second partition, and the third partition.

In the loop operation performed on a partition-by-partition basis, firstly, at Step S213, the first assigning unit 22 selects, for the target partition, the set of nodes 30 having the largest time stamp specified in the data retention table. In this example, a time stamp is a value that is incremented after every instance of updating the data pieces of the target partition. Thus, at Step S213, the first assigning unit 22 can select, for the target partition, the set of nodes 30 in which the latest data pieces are stored.

Then, at Step S214, from the set of nodes 30 selected at Step S213, the first assigning unit 22 selects a single node 30 that is assigned to serve as the owner node and the backup node for the least number of partitions according to the next-role table; and assigns the selected node 30 to serve as the owner node. With that, from among the set of nodes 30 in which the latest data pieceds are stored, the first assigning unit 22 can assign the node 30 having the least load as the owner node.

Meanwhile, if more than one node 30 is assigned to serve as the owner node and the backup node for the least number of partitions, then the first assigning unit 22 can assign a node 30 having a higher computing power to serve as the owner node on a priority basis as compared to a node 30 having a lower computing power. Alternatively, the first assigning unit 22 can assign a node 30 receiving a smaller number of access requests to serve as the owner node on a priority basis as compared to a node 30 receiving a greater number of access requests.

Subsequently, at Step S215, for the target partition, the first assigning unit 22 selects such a set of nodes 30 that does not include the node 30 assigned to serve as the owner node but that includes the nodes 30 having respective time stamps within a predetermined difference from the largest time stamp. With that, for the target partition, the first assigning unit 22 can select a set of nodes 30 in which either the latest data pieces are stored or the data pieces relatively closer to the latest data pieces are stored.

Then, from Step S216 to Step S219, the first assigning unit 22 performs a loop operation for a number of times equal to the number of replications. Herein, the number of replications represents the largest number of nodes 30 for which the replication operation can be performed with the node 30 that is assigned to serve as the owner node. Thus, the number of replications is identical to the number of assignable backup nodes.

In the loop operation performed for a number of times equal to the number of replications; firstly, at Step S217, from the set of nodes 30 selected at Step S215, the first assigning unit 22 determines whether or not there is a node 30 which can be assigned to serve as the backup node. If there is a node 30 which can be assigned to serve as the backup node (Yes at Step S217), then the first assigning unit 22 proceeds to the operation at Step S218.

On the other hand, if there is no node which can be assigned as the backup node (No at Step S217), then the first assigning unit 22 mandatorily exits the loop operation performed for a number of times equal to the number of replications, and proceeds to the operation at Step S220. In view of that, sometimes the first assigning unit 22 calculates the next-role table in which the backup nodes are not present or in which the number of backup nodes is smaller than the number of replications.

At Step S213, from among the set of nodes 30 selected at Step S215, the first assigning unit 22 assigns, as the backup node, the node 30 that is assigned to serve as the owner node and the backup node for the least number of partitions according to the next-role table. With that, from among the set of nodes 30 in which either the latest data pieces are stored or the data pieces relatively closer to the latest data pieces are stored, the first assigning unit 22 can assign the nodes 30 to serve as the backup nodes in ascending order of the processing load.

Meanwhile, if more than one node 30 is assigned to serve as the owner node and the backup node for the least number of partitions, then the first assigning unit 22 can assign a node 30 having a higher computing power to serve as the backup node on a priority basis as compared to a node 30 having a lower computing power. Alternatively, the first assigning unit 22 can assign a node 30 receiving a smaller number of access requests to serve as the backup node on a priority basis as compared to a node 30 receiving a greater number of access requests.

Subsequently, the first assigning unit 22 excludes, from the set of nodes 30, the node 30 assigned to serve as the backup node; and proceeds to the operation at Step S219. At Step S219, if the number of operations from Step S216 to Step S219 is smaller than the number of replications, then the first assigning unit 22 returns to the operation at Step S216. However, if the number of operations from Step S216 to Step S219 is equal to the number of replications, then the first assigning unit 22 proceeds to the operation at Step S220.

Then, at Step S220, if the operations from Step S212 to Step S220 are not yet performed with respect to all partitions, then the first assigning unit 22 returns to the operation at Step S216. When the operations from Step S212 to Step S220 are performed with respect to all partitions, the first assigning unit 22 ends the calculation of the next-role table and exits the present flowchart.

In this way, the first assigning unit 22 assigns the nodes 30 in such a way that each of a plurality of partitions has an owner node assigned thereto. With that, the first assigning unit 22 can at least make the database work. Along with that, the first assigning unit 22 assigns the nodes 30 in such a way that backup nodes are present to the extent possible. With that, the first assigning unit 22 can guarantee the redundancy of the database. Moreover, the first assigning unit 22 assigns the nodes 30 to serve as the owner nodes and the backup nodes in ascending order of the processing load. With that, the first assigning unit 22 can even out the processing load of each of a plurality of nodes 30.

Figure 14:
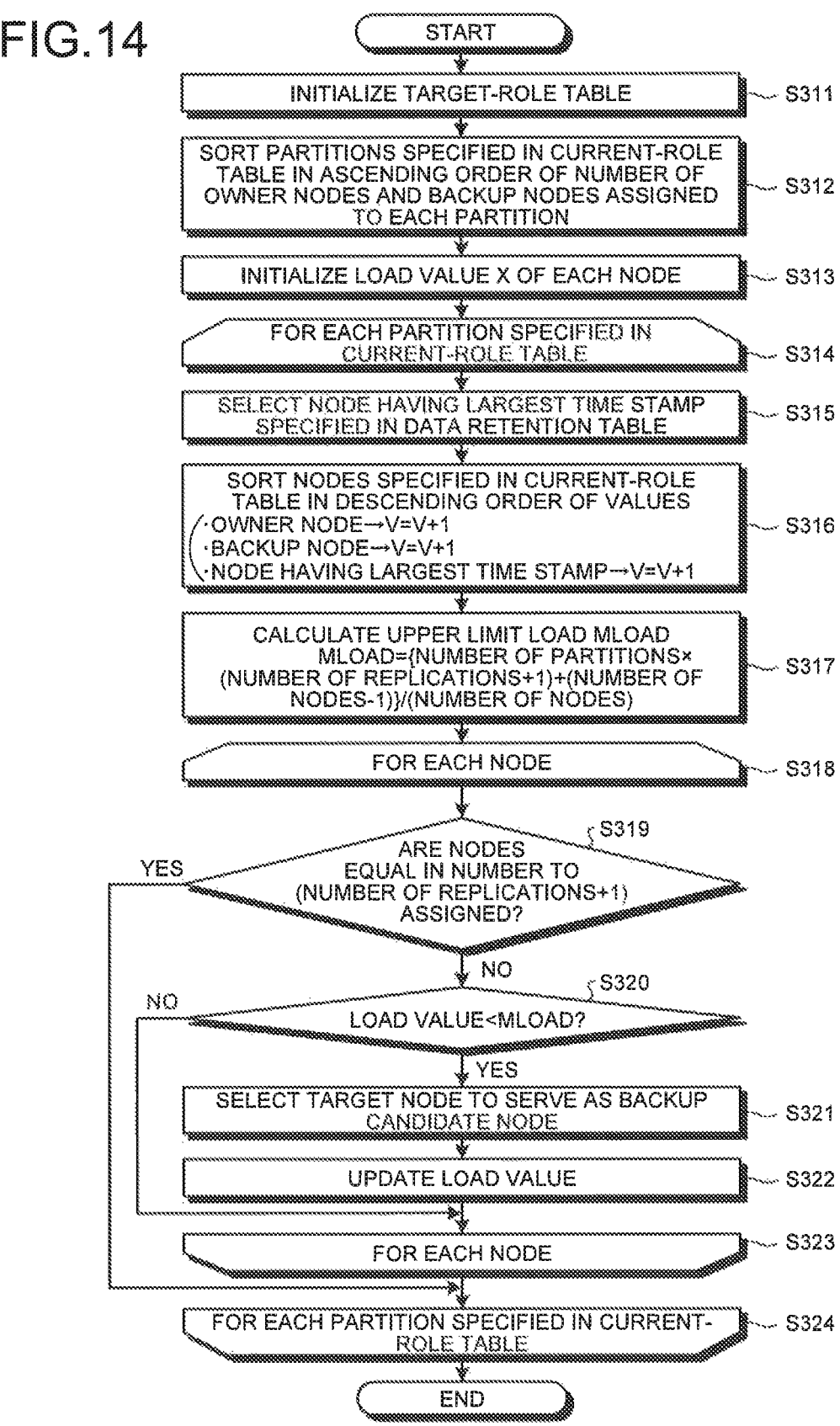
FIG. 14 is a flowchart for explaining the operations by which a second assigning unit of the management device calculates the target-role table.

FIG. 14 is a flowchart for explaining the operations by which the second assigning unit 23 of the management device 20 calculates the target-role table. The second assigning unit 23 is called by the cluster managing unit 24 at Step S141 illustrated in FIG. 12, and performs the operations from Step S311 to Step S324 explained below.

Firstly, at Step S311, the second assigning unit 23 initializes the target-role table. At that time, the second assigning unit 23 associates each of a plurality of nodes 30 specified in the target-role table with the nodes 30 specified in the data retention table. With that, in the target-role table, the second assigning unit 23 can reflect the node 30 that has been separated off due to a failure and the node 30 that has been newly added.

Then, at Step S312, the second assigning unit 23 sorts the partitions specified in the current-role table in ascending order of the total number of owner nodes and backup nodes assigned to each partition. With that, the second assigning unit 23 can assign the backup candidate nodes to the partitions in ascending order of the number of nodes 30 assigned to serve as the backup nodes for each partition. That is, in the current-role table, the second assigning unit 23 can assign the nodes 30 to serve as the backup candidate nodes to the partitions in ascending order of the redundancy of each partition.

Subsequently, at Step S313, the second assigning unit 23 initializes a load value with respect to each of a plurality of nodes 30. A load value is a value that increases in response to assigning the corresponding node 30 to serve as the backup candidate node. Herein, as an example, the second assigning unit 23 initializes each load value to "0".

Then, from Step S314 to Step S324, the second assigning unit 23 performs a loop operation on a partition-by-partition basis. In this case, the second assigning unit 23 selects the target partition in the order of partitions sorted in the current-role table at Step S312, and performs the loop operation.

In the loop operation performed on a partition-by-partition basis; firstly, at Step S315, the second assigning unit 23 selects, for the target partition, the node 30 having the largest time stamp specified in the data retention table.

Then, at Step S316, the second assigning unit 23 sorts the nodes 30 specified in the current-role table in descending order of values V. Herein, regarding the nodes 30 assigned to serve as the owner nodes, the value V is set to "+1". Regarding the nodes assigned to serve as the backup nodes, the value V is set to "+1". Regarding the nodes having the largest time stamp, the value V is set to "+1". Thus, regarding a node 30 that neither is an owner node nor is a backup node nor has the largest time stamp, the value V is equal to "0".

With that, as the nodes 30 that would serve as the backup candidate nodes, the second assigning unit 23 can firstly assign the nodes 30 that are assigned to serve as the owner nodes and the backup nodes or the nodes 30 in which the latest data pieces are stored.

Meanwhile, if more than one node 30 has the same value V, then the second assigning unit 23 arranges the nodes 30 having higher computing power near the top of the list so that they are assigned to serve as the backup candidate nodes on a priority basis. With that, the second assigning unit 23 can assign the nodes 30 to serve as the backup candidate nodes in such a way that a node 30 having a higher computing power serves as the owner node or the backup node on a priority basis as compared to a node 30 having a lower computing power. Alternatively, the second assigning unit 23 can arrange the nodes 30 receiving a smaller number of access requests near the top of the list so that they are assigned to serve as the backup candidate node on a priority basis. With that, the second assigning unit 23 can assign the nodes 30 to serve as the backup candidate nodes in such a way that a node 30 receiving a smaller number of access requests to serve as the owner node or the backup node on a priority basis as compared to a node 30 receiving a greater number of access requests.

Subsequently, at Step S317, the second assigning unit 23 calculates an upper limit load MLOAD, which is a constant number, using Equation (1) given below.

$$MLOAD = \{\text{number of partitions} \times (\text{number of replications}+1) + (\text{number of nodes}-1)\} / (\text{number of nodes}) \quad (1)$$

Herein, (number of replications+1) represents the maximum number of owner nodes and backup nodes that can be assigned to a single partition. The upper limit load MLOAD represents the upper limit standard of the number of partitions for which a single node 30 can be assigned to serve as the backup candidate node.

Subsequently, from Step S318 to Step S323, the second assigning unit 23 performs a loop operation for each node 30. In this case, the second assigning unit 23 selects the target node 30 according to the order of nodes specified in the current-role table after the sorting performed at Step 3316, and performs the loop operation.

In the loop operation performed for each node 30; firstly, at Step S319, the second assigning unit 23 determines whether or not the nodes 30 equal in number to (number of replications+1) are assigned to serve as the backup candidate nodes. If the nodes 30 equal in number to (number of replications+1) are assigned to serve as the backup candidate nodes (Yes at Step S319), then the second assigning unit 23 proceeds to the operation at Step S324. In this case, with respect to the target partition, the second assigning unit 23 assigns the maximum number of nodes 30 to serve as the backup candidate nodes.

However, if the nodes 30 equal in number to (number of replications+1) are not assigned to serve as the backup candidate nodes (No at Step S319), then the second assigning unit 23 proceeds to the operation at Step S320.

At Step S320, the second assigning unit 23 determines whether the load value of the target node 30 is smaller than the upper limit load MLOAD. If the load value of the target node 30 is smaller than the upper limit load MLOAD (Yes at Step S320), then the second assigning unit 23 proceeds to the operation at Step S321.

On the other hand, if the load value of the target node 30 is equal to or greater than the upper limit load MLOAD (No at Step S320), then the second assigning unit 23 proceeds to the operation at Step S323. With that, in case a particular node 30 has been assigned to serve as the backup candidate node for a number of times equal to or greater than a reference value, the second assigning unit 23 can avoid assigning that node 30 anymore to serve as the backup candidate node. As a result, the second assigning unit 23 can assign, in a distributed manner, the roles of the backup candidate nodes to a plurality of nodes 30.

At Step S321, with respect to the target partition, the second assigning unit 23 assigns the target node 30 to serve as the backup candidate node. Then, at Step S322, the second assigning unit 23 updates the load value of the target node 30 by adding "1". With that, every time the node 30 is assigned to serve as the backup candidate node, the second assigning unit 23 can increment the load value by one. Once the operation at Step S322 is completed, the second assigning unit 23 proceeds to the operation at Step S323.

Then, at Step S323, if the operations from Step S318 to Step S323 are not yet performed for each of a plurality of nodes 30, then the second assigning unit 23 returns to the operation at Step S318. When the operations from Step S318 to Step S323 are performed for each of a plurality of nodes 30, the second assigning unit 23 proceeds to the operation at Step S324.

Subsequently, at Step S324, if the operations from Step S314 to Step S324 are not yet performed for each of a plurality of partitions, then the second assigning unit 23 returns to the operation at Step S314. When the operations from Step S314 to Step S324 are performed for each of a plurality of partitions, then the second assigning unit 23 ends the calculation of the target-role table and exits the present flowchart.

In this way, the second assigning unit 23 assigns the backup candidate nodes to the partitions in ascending order of the redundancy (i.e., in ascending order of the number of assigned backup nodes). Hence, the redundancy of the database can be guaranteed in an efficient manner. Moreover, with respect to a node 30 that has been assigned to serve as the backup candidate node for a number of times equal to or greater than a reference value, the second assigning unit 23 does not assign the node 30 anymore to serve as the backup candidate node. As a result, a plurality of nodes 30 can be assigned in a distributed manner to serve as the backup candidate nodes.

Figure 15:
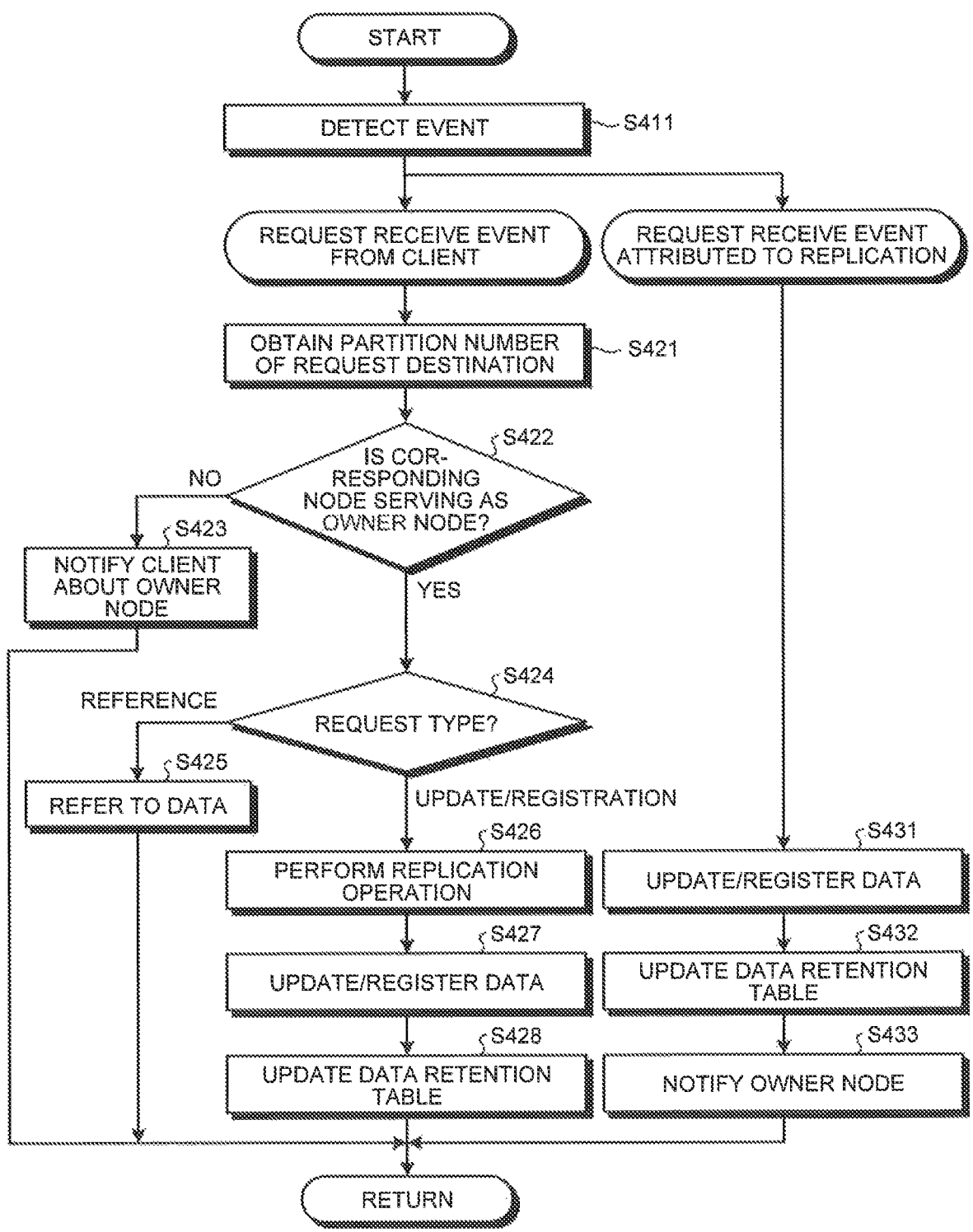
FIG. 15 is a diagram illustrating an operation flowchart of an access processing unit of the node.

FIG. 15 is a diagram illustrating an operation flowchart of the access processing unit 33 of the node 30. The access processing unit 33 performs operations from Step S411 to Step S433 explained below.

Firstly, at Step S411, the access processing unit 33 detects a request receive event from a client or detects a request receive event attributed to a replication operation. A request receive event from a client occurs in the case when an access request with respect to the data is received from a client via a network. A request receive event attributed to a replication operation occurs in the case when an update request or a registration request attributed to a replication operation is received via a network from another node 30 serving as the owner node.

When a request receive event from a client is detected, the access processing unit 33 proceeds to the operation at Step S421. When a request receive event attributed to a replication operation is detected, the access processing unit 33 proceeds to the operation at Step S431.

When a request receive event from a client is received; at Step S421, for example, the access processing unit 33 calculates and obtains the number given to a request destination partition specified in the access request from the client. Then, at Step S422, the access processing unit 33 refers to the current-role table and determines whether or not the corresponding node has been assigned to serve as the owner node for the request destination partition.

If the corresponding node has not been assigned to serve as the owner node for the request destination partition (No at Step S422); then, at Step S423, the access processing unit 33 notifies the client about the number given to the node 30 which has been assigned to serve as the owner node, and returns to the operation at Step S411.

On the other hand, if the corresponding node has been assigned to serve as the owner node for the request destination partition (Yes at Step S422); then, at Step S424, the access processing unit 33 determines whether the type of the access request points to a reference request, or an update request, or a registration request.

If the type of the access request points to a reference request (reference request at Step S424); then, at Step S425, the access processing unit 33 reads from the data storing unit 31 data for which the reference request is issued and sends the data to the client, and returns to the operation at Step S411.

If the type of the access request points to an update request or a registration request (update request/registration request at Step S424); then, at Step S426, the access processing unit 33 performs a replication operation with the other node 30 that has been assigned to serve as the backup node for the request destination partition. That is, the access processing unit 33 sends an access request, which is identical to the update request or the registration request received from the client, to the node 30 which has been assigned to serve as the backup node.

Once the replication operation is completed; then, at Step S427, according to the update request or the registration request issued by the client, the access processing unit 33 either updates the data stored in the data storing unit 31 or registers new data in the data storing unit 31. Then, at Step S428, the access processing unit 33 updates the corresponding time stamp in the data retention table by incrementing the time stamp by one, and returns to the operation at Step S411.

Meanwhile, if a request receive event attributed to a replication operation is detected; then, at Step S431, according to an update request or a registration request issued by the node 30 which has been assigned to serve as the owner node, the access processing unit 33 either updates the data stored in the data storing unit 31 or registers new data in the data storing unit 31. Then, at Step S432, the access processing unit 33 updates the corresponding time stamp in the data retention table by incrementing the time stamp by one. Subsequently, at Step S433, the access processing unit 33 notifies the owner node about the completion of updating or registration, and returns to the operation at Step S411.

Meanwhile, at Step S425 and Step S428, the access processing unit 33 can also receive from a client a transaction that contains a sequence of access requests, and can perform transaction processing according to the access requests received from the client. Moreover, at Step S426, in the case of sending an update request or a registration request by means of a replication operation, the access processing unit 33 can send the transaction containing a sequence of access requests to the node 30 that is assigned to serve as the backup node. Furthermore, at Step S431, the access processing unit 33 can receive the transaction, which contains a sequence of access requests, from the node 30 that is assigned to serve as the owner node; and can perform transaction processing according to the access requests received from the node 30 that is assigned to serve as the owner node.

Figure 16:
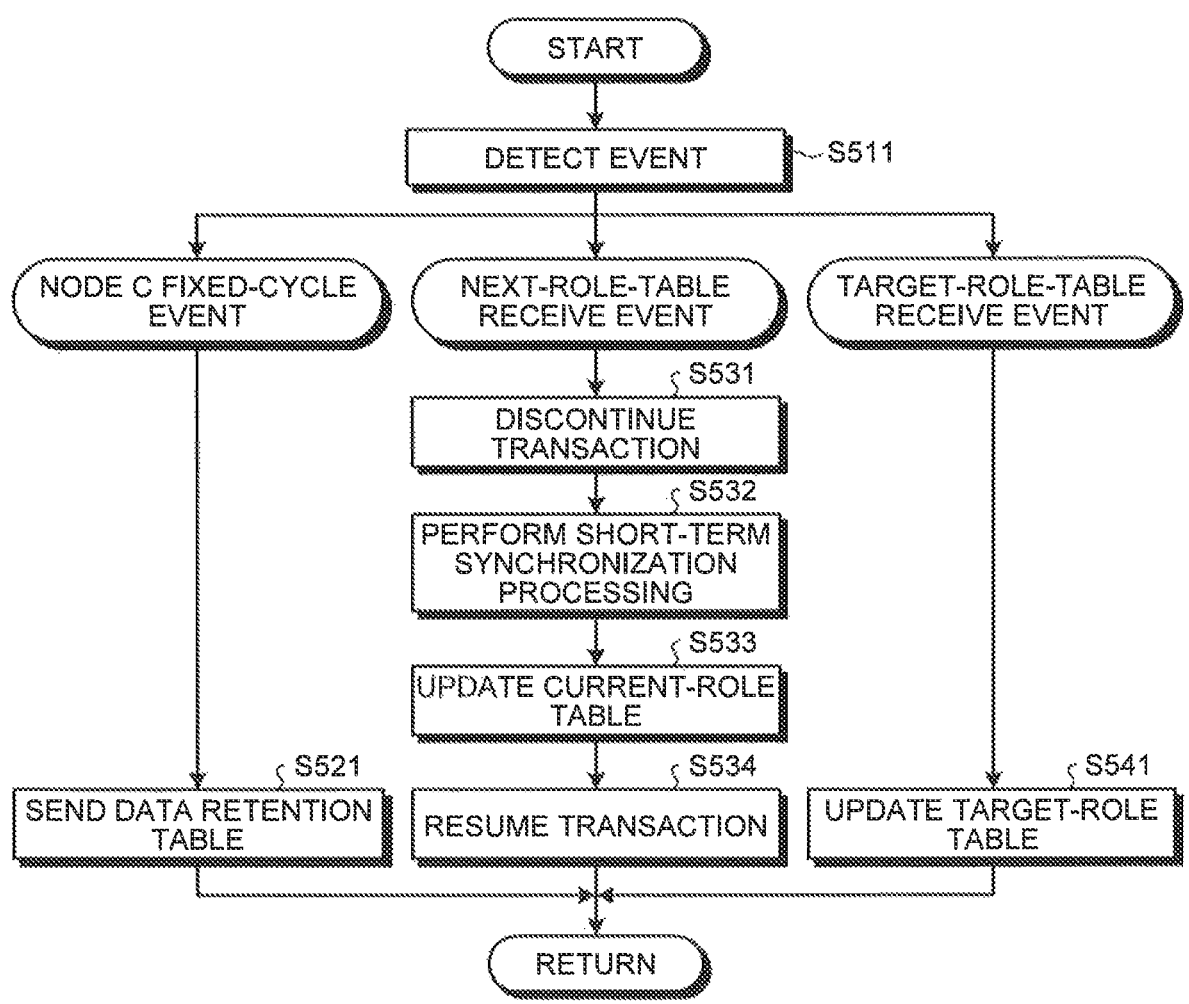
FIG. 16 is a diagram for explaining an operation flowchart of a node managing unit of the node.

FIG. 16 is a diagram for explaining an operation flowchart of the node managing unit 34 of the node 30. The node managing unit 34 performs operations from Step S511 to Step S541 explained below.

Firstly, at Step S511, the node managing unit 34 detects a third fixed-cycle event, a next-role-table receive event, or a target-role-table receive event. A third fixed-cycle receive event occurs on a periodic basis. A next-role-table receive event occurs when the node managing unit 34 receives the next-role table. A target-role-table receive event occurs when the node managing unit 34 receives the target-role table.

When a third fixed-cycle event is detected, the node managing unit 34 proceeds to the operation at Step S521. When a next-role-table receive event is detected, the node managing unit 34 proceeds to the operation at Step S531. When a target-role-table receive event is detected, the node managing unit 34 proceeds to the operation at Step S541.

When a third fixed-cycle event is detected; then, at Step S521, the node managing unit 34 sends the data retention table, which is stored in the table memory unit 32, to the cluster managing unit 24 of the management device 20. Then, the node managing unit 34 returns to the operation at Step S511.

When a next-role-table receive event is detected; then, at Step S531, if the access processing unit 33 is executing a transaction, the node managing unit 34 discontinues the transaction. Then, at Step S532, the node managing unit 34 performs short-term synchronization processing according to the next-role table that is received.

More particularly, with respect to each of a plurality of partitions, if the data pieces stored in the node 30 assigned to serve as the owner node differ from the data pieces stored in the node 30 assigned to serve as the backup node, then the node managing unit 34 causes the access processing unit 33 to perform an operation identical to the replication operation. With that, with respect to each of a plurality of partitions, the node managing unit 34 can achieve synchronization between the node 30 assigned to serve as the owner node and the node 30 assigned to serve as the backup node. Then, with respect to each of a plurality of nodes, the node managing unit 34 cases the access processing unit 33 to perform operations according to the new roles (as the owner node and the backup node) assigned in the next-role table.

Once the short-term synchronization processing is completed; then, at Step S533, the node managing unit 34 rewrites the current-role table with the contents of the next-role table. After that, the access processing unit 33 can receive an access request from a client.

Subsequently, at Step S534, the node managing unit 34 resumes the transaction that was discontinued. Then, the node managing unit 34 returns to the operation at Step S511.

If a target-role-table receive event is detected; then, at Step S541, the node managing unit 34 updates the target-role table stored in the table memory unit 32. Then, the node managing unit 34 returns to the operation at Step S511.

Figure 17:
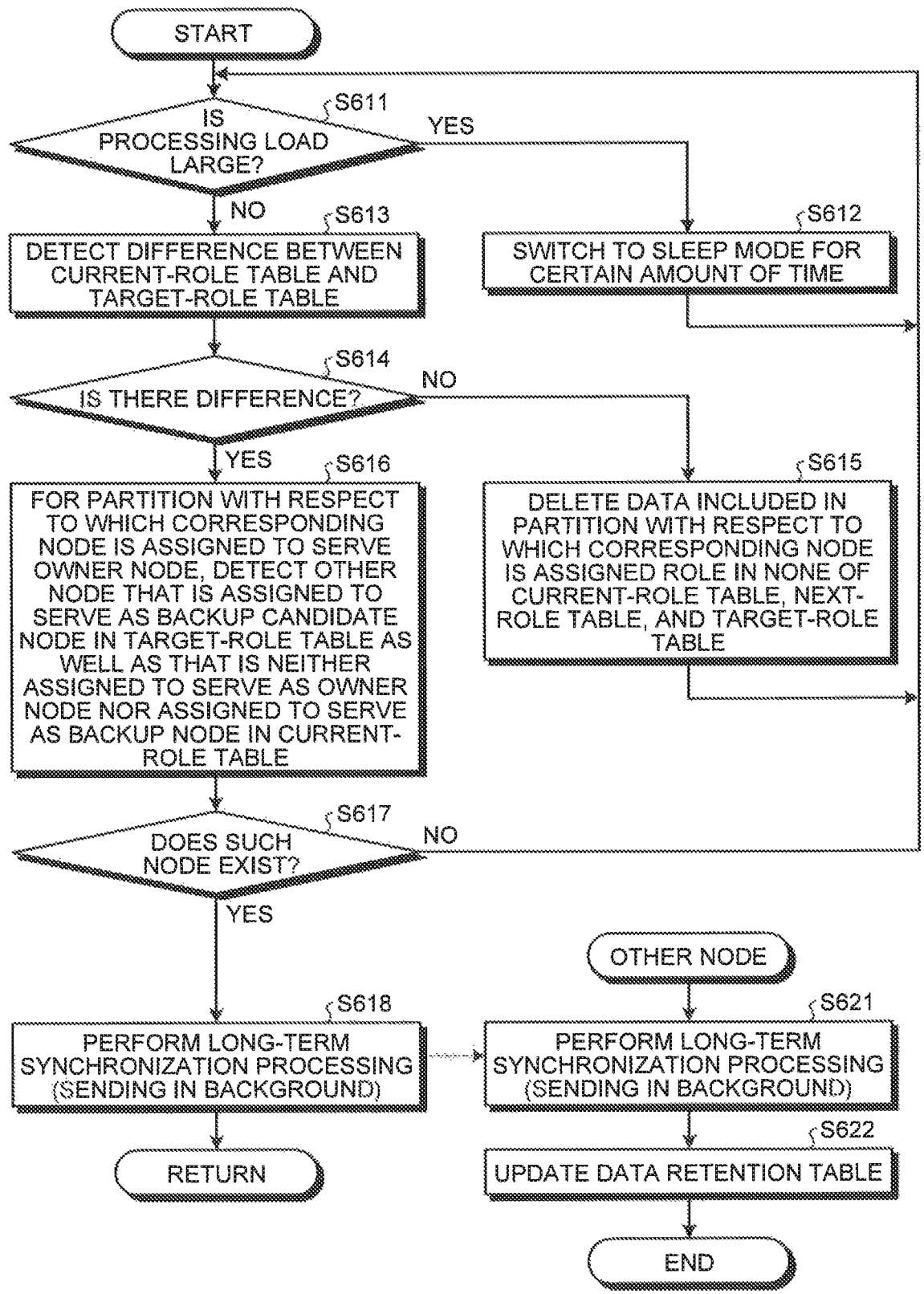
FIG. 17 is a diagram illustrating an operation flowchart of a transferring unit of the node.

FIG. 17 is a diagram illustrating an operation flowchart of the transferring unit 35 of the node 30. The transferring unit 35 performs operations from S611 to Step S618 as well as operations at Step S621 and Step S622 explained below.

Firstly, at Step S611, the transferring unit 35 determines whether or not the processing load of the CPU 12 is greater than a predetermined reference value. If the processing load of the CPU 12 is greater than the reference value (Yes at Step S611); then, at Step S612, the transferring unit 35 switches to a sleep mode for a certain amount of time and then returns to the operation at Step S611.

However, if the processing load of the CPU 12 is equal to or smaller than the reference value (No at Step S611); then, at Step S613, the transferring unit 35 detects the difference between the current-role table and the target-role table. Subsequently, at Step S614, the transferring unit 35 determines whether or not there is difference between the current-role table and the target-role table.

If there is no difference between the current-role table and the target-role table (No at Step S614); then, at Step S615, the transferring unit 35 deletes the data pieces included in a partition with respect to which the corresponding node has been assigned a role in none of the current-role table, the next-role table, and the target-role table. After performing the operation at Step S615, the transferring unit 35 returns to the operation at Step S611.

On the other hand, if there is difference between the current-role table and the target-role table (Yes at Step S614); then, at Step S616, for the partition with respect to which the corresponding node is assigned to serve as the owner node in the current-role table, the transferring unit 35 detects another node 30 that is assigned to serve as the backup candidate node in the target-role table as well as that is neither assigned to serve as the owner node nor assigned to serve as the backup node in the current-role table.

Subsequently, at Step S617, the transferring unit 35 determines whether or not another node 30 is present that is assigned to serve as the backup candidate node in the target-role table as well as that is neither assigned to serve as the owner node nor assigned to serve as the backup node in the current-role table. If such a node 30 is not present (No at Step 3617), then the transferring unit 35 returns to the operation at Step S611.

On the other hand, if such a node is present (Yes at Step S617); then, at Step S618, the transferring unit 35 starts long-term synchronization processing without discontinuing the operations with respect to the access request from the client. More particularly, regarding the partition for which the corresponding node is assigned to serve as the owner node in the current-role table, the transferring unit 35 sends the data pieces of that partition to the other node 30 that is assigned to serve as the backup candidate node in the target-role table as well as that is neither assigned to serve as the owner node nor assigned to serve as the backup node in the current-role table. In this case, the transferring unit 35 sends the data pieces in the background so as not to interrupt the transaction execution by the access processing unit 33. With that, the transferring unit 35 becomes able to perform the long-term synchronization processing without causing a decrease in the response speed with respect to the access request from the client.

Once the operation at Step S618 is completed, the transferring unit 35 returns to the operation at Step S611.

Meanwhile, in the other node 30 that is assigned to serve as the backup candidate node in the target-role table as well as that is neither assigned to serve as the owner node nor assigned to serve as the backup node in the current-role table; the corresponding transferring unit 35 performs operations at Step S621 and Step S622 explained below.

At Step S621, the transferring unit 35 starts long-term synchronization processing without discontinuing the operations with respect to the access request from the client. More particularly, regarding the partition with respect to which the corresponding node is assigned to serve as the backup candidate node in the target-role table as well as is neither assigned to serve as the owner node nor assigned to serve as the backup node in the current-role table, the transferring unit 35 receives the data pieces of that partition from the node 30 that is assigned to serve as the owner node with respect to that partition. In this case, the transferring unit 35 receives the data pieces in the background so as not to interrupt the transaction execution by the access processing unit 33.

Subsequently, at Step S622, the transferring unit 35 updates the data retention table. Once the long-term synchronization processing is completed, a replica of the data pieces, which are stored in the node 30 assigned to serve as the owner node, gets stored. Thus, by updating the data retention table, the transferring unit 35 can match the time stamp for the concerned partition with the time stamp in the data retention table of the owner node. Once the operation at Step S622 is completed, the transferring unit 35 exits the present flowchart.

In this way, a replica of the data pieces of the node 30 assigned to serve as the owner node is generated by the transferring unit 35 in the node 30 that is assigned to serve as the backup candidate node. As a result, the transferring unit 35 can newly generate a node 30 that can be assigned to serve either as the owner node or as the backup node.

Figure 18:
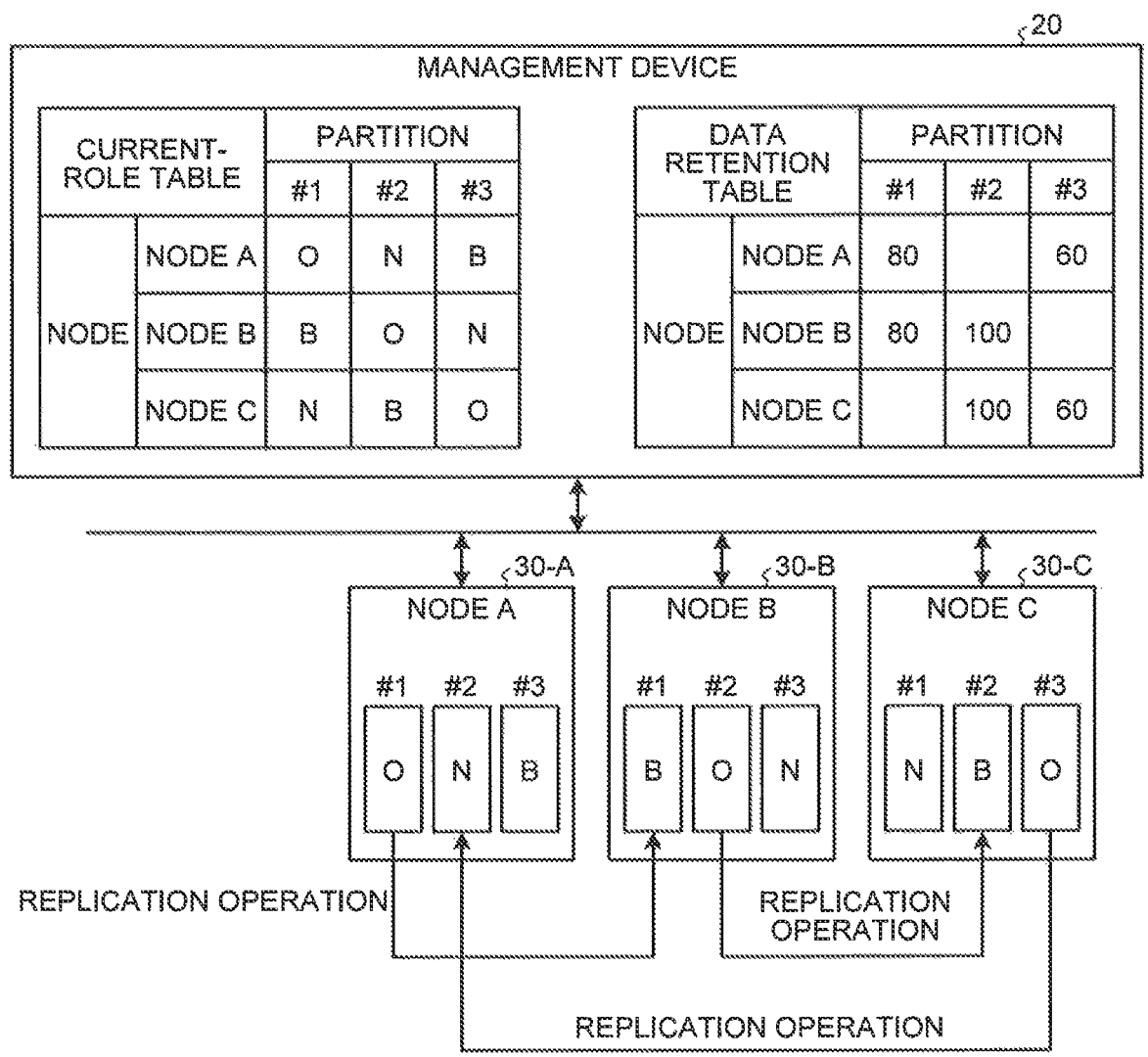
FIG. 18 is a diagram illustrating the states of a node 30-A to a node 30-C in a case in which each of three partitions #1 to #3 is assigned with the nodes serving as the owner node and the backup node.

Explained below with reference to FIG. 18 to FIG. 24 is an example of operations performed in the database system 10. FIG. 18 is a diagram illustrating the states of a node 30-A to a node 30-C in a case in which each of the three partitions #1 to #3 is assigned with the nodes 30 serving as the owner node and the backup node.

In the present example, as illustrated in FIG. 18, with respect to the partition #1, the node 30-A is assigned to serve as the owner node and the node 30-B is assigned to serve as the backup node. Moreover, with respect to the partition #2, the node 30-B is assigned to serve as the owner node and the node 30-C is assigned to serve as the backup node. Furthermore, with respect to the partition #3, the node 30-C is assigned to serve as the owner node and the node 30-A is assigned to serve as the backup node.

The nodes 30-A and 30-B perform replication operations with respect to the partition #1 by means of transactions. As a result, as illustrated in data retention table in FIG. 18, the time stamps of the nodes 30-A and 30-B have the same value for the partition #1.

The nodes 30-B and 30-C perform replication operations with respect to the partition #2 by means of transactions. As a result, as illustrated in data retention table in FIG. 18, the time stamps of the nodes 30-B and 30-C have the same value for the partition #2.

The nodes 30-C and 30-A perform replication operations with respect to the partition #3 by means of transactions. As a result, as illustrated in data retention table in FIG. 18, the time stamps of the nodes 30-C and 30-A have the same value for the partition #3.

Figure 19:
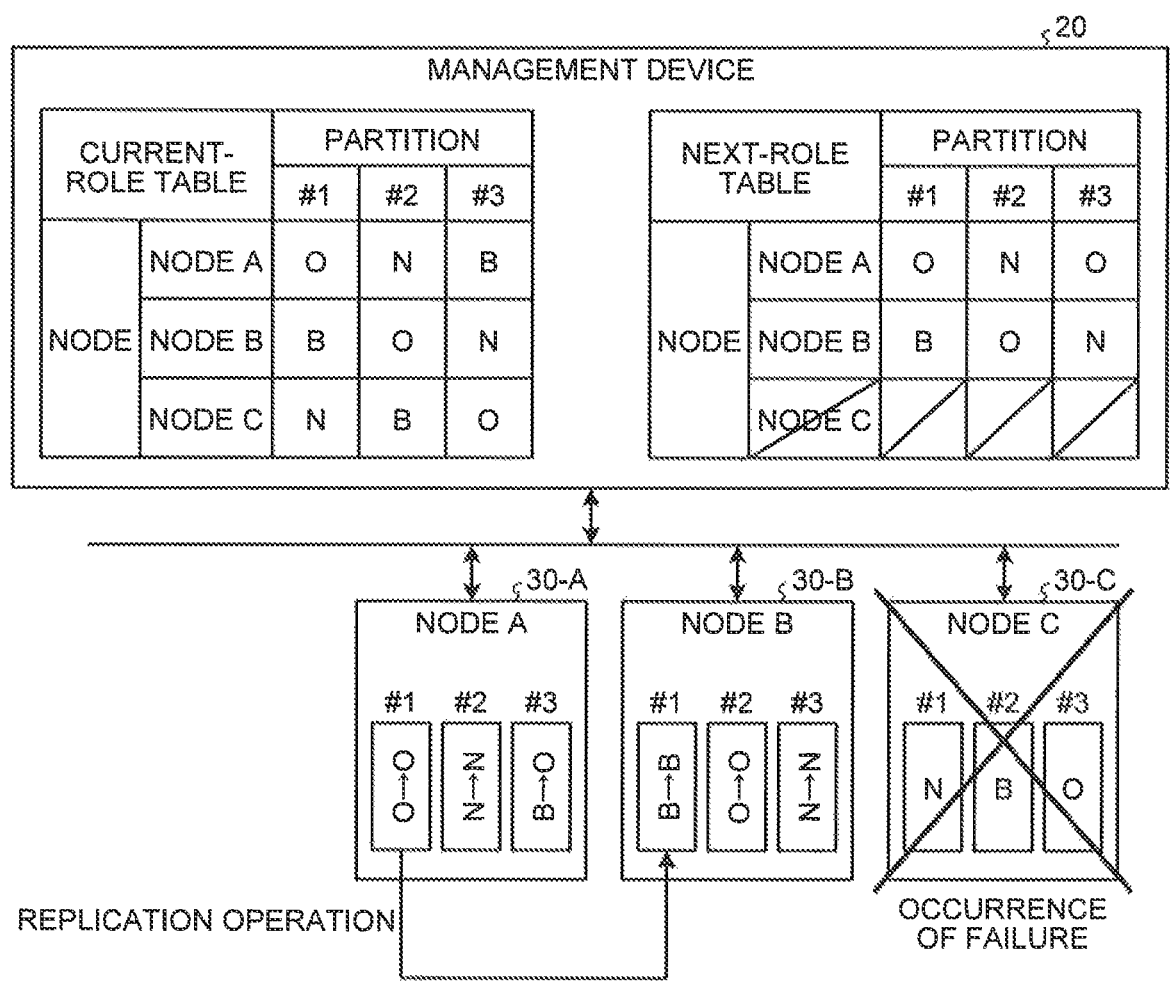
FIG. 19 is a diagram illustrating the states of the node 30-A to the node 30-C after short-term synchronization processing is performed in response to a failure occurring in the node 30-C in the state illustrated in FIG. 18.

FIG. 19 is a diagram illustrating the states of the node 30-A to the node 30-C after short-term synchronization processing is performed in response to a failure occurring in the node 30-C in the state illustrated in FIG. 18. Herein, it is assumed that the cluster managing unit 24 of the management device 20 cannot detect the data retention table from the node 30-C in the state illustrated in FIG. 18, and detects that a failure has occurred in the node 30-C.

When a failure occurs in any one node 30 of a plurality of nodes 30, the cluster managing unit 24 of the management device 20 separates off the node 30 in which a failure has occurred and then causes the first assigning unit 22 to calculate the next-role table.

In response to being called by the cluster managing unit 24; the first assigning unit 22 reassigns, with the exclusion of the node 30 in which a failure has occurred, the nodes 30 that would serve as the owner nodes and the nodes 30 that would serve as the backup nodes, to thereby generate the next-role table. In this case, with the aim of at least making the database work, the first assigning unit 22 assigns the nodes 30 in such a way that each of a plurality of partitions has at least the owner node assigned thereto. For example, if a failure occurs in the node 30 assigned to serve as the owner node; then the first assigning unit 22 assigns the node 30 which was assigned to serve as the backup node to now serve as the owner node. Moreover, with the aim of further enhancing the redundancy of the database, the first assigning unit 22 assigns the nodes 30 in such a way that each of a plurality of partitions has the backup node assigned thereto to the extent possible.

In the present example, as a result of the reassignment, as illustrated in the next-role table in FIG. 19; with respect to the partition #1, the node 30-A is assigned to serve as the owner node and the node 30-B is assigned to serve as the backup node. Moreover, with respect to the partition #2, the node 30-B is assigned to serve as the owner node. Furthermore, with respect to the partition #3, the node 30-A is assigned to serve as the owner node.

Then, the cluster managing unit 24 distributes the next-role table to the node 30-A and the node 30-B. Upon receiving the next-role table, the node managing unit 34 of each of the node 30-A and the node 30-B performs short-term synchronization processing and rewrites the contents of the current-role table with the contents of the next-role table. With that, each of the node 30-A and the node 30-B can perform operations according to its newly-assigned role.

Figure 20:
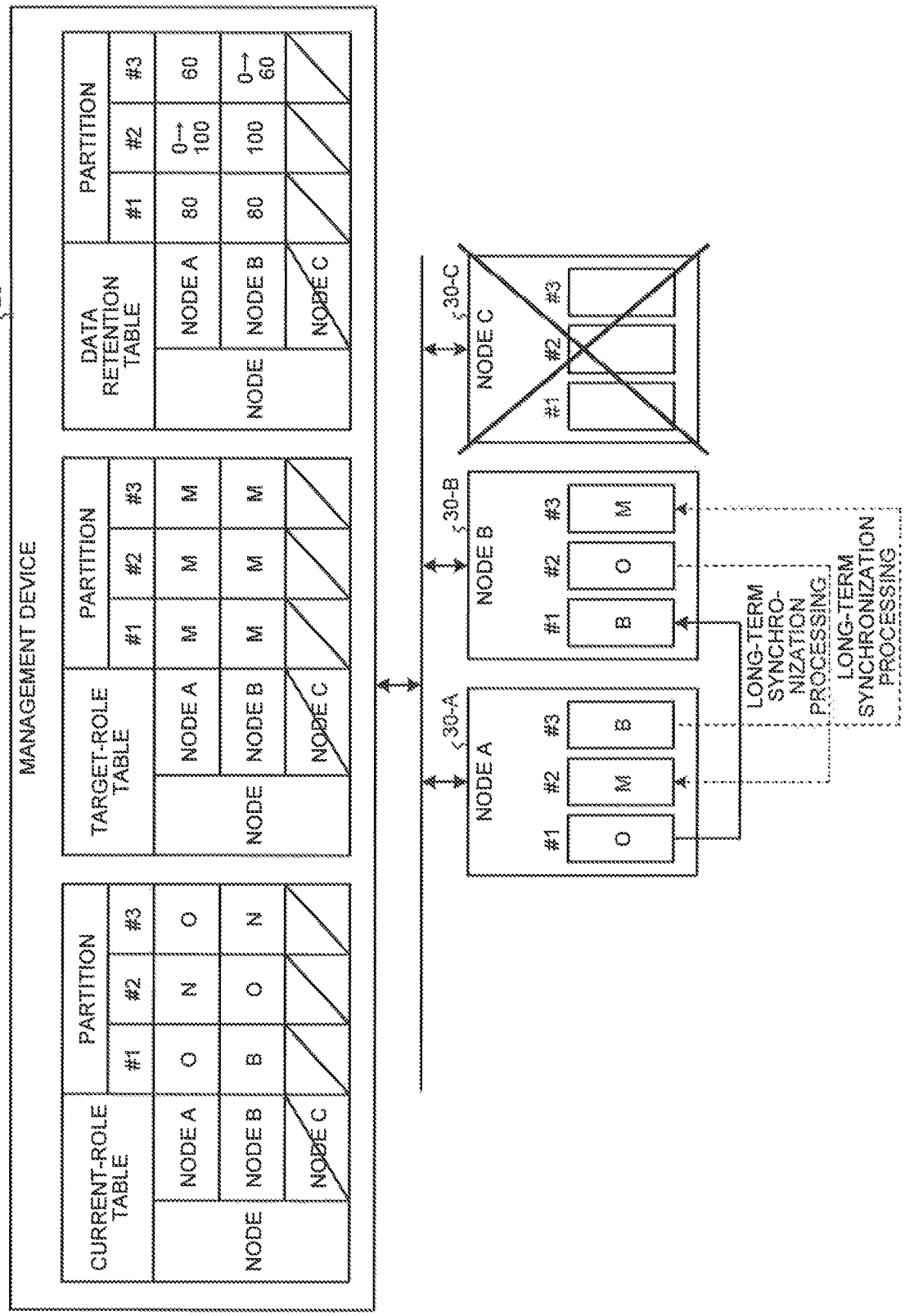
FIG. 20 is a diagram illustrating an example of long-term synchronization processing performed in the state illustrated in FIG. 19.

FIG. 20 is a diagram illustrating an example of long-term synchronization processing performed in the state illustrated in FIG. 19. The cluster managing unit 24 of the management device 20 separates off the node 30-C in which a failure has occurred, and then causes the second assigning unit 23 to calculate the target-role table.

In response to being called by the cluster managing unit 24; the second assigning unit 23 reassigns, with the exclusion of the node 30 in which a failure has occurred, the nodes 30 that would serve as the backup candidate nodes, to thereby generate the target-role table. In this case, with the aim of further enhancing the redundancy of the database, the second assigning unit 23 assigns the nodes 30 that would serve as the backup candidate nodes in such a way that each of a plurality of partitions at least has the owner node and the backup node assigned thereto.

In the state illustrated in FIG. 19, with respect to the partition #2 as well as the partition #3, no node 30 is assigned to serve as the backup node. Thus, the second assigning unit 23 assigns the node 30-A to serve as the backup candidate node for the partition #2, and assigns the node 30-B to serve as the backup candidate node for the partition #3.

Meanwhile, in the present example, the second assigning unit 23 assigns, as the backup candidate nodes, such nodes 30 too that are already assigned to serve as the owner nodes and the backup nodes in the current-role table. For that reason, as illustrated in the target-role table in FIG. 20, with respect to each of the partitions #1 to #3, the node 30-A as well as the node 30-B is assigned to serve as the backup candidate node.

Then, the cluster managing unit 24 distributes the target-role table to the node 30-A and the node 30-B. Subsequently, the transferring unit 35 of the node 30-A as well as the node 30-B performs long-term synchronization processing with respect to the portion of difference between the current-role table and the target-role table. That is, the transferring unit 35 of the node 30-B sends the data pieces of the partition #2 to the node 30-A in the background. Moreover, the transferring unit 35 of the node 30-A sends the data pieces of the partition #3 to the node 30-B in the background.

At that time, each transferring unit 35 performs the long-term synchronization processing without discontinuing the operations with respect to the access request from the client.

Once the long-term synchronization processing is completed, the node 30-A can store therein a replica of the data pieces of the partition #2. Moreover, as illustrated in the data retention table in FIG. 20, the time stamps of the nodes 30-A and 30-B have the same value for the partition #2.

Similarly, the node 30-B can store therein a replica of the data pieces of the partition #3. Moreover, as illustrated in the data retention table in FIG. 20, the time stamps of the nodes 30-A and 30-B have the same value for the partition #3.

Figure 21:
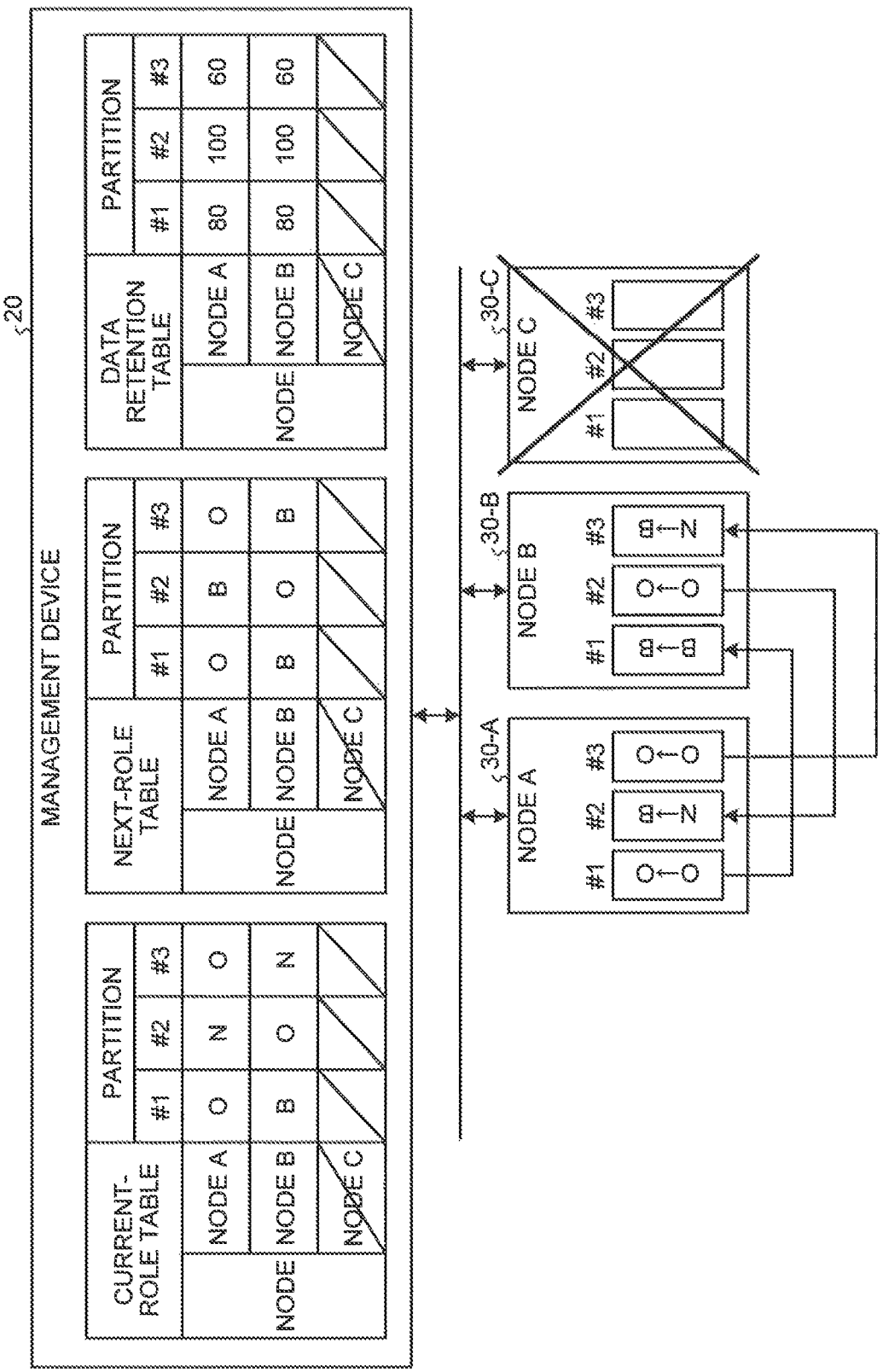
FIG. 21 is a diagram illustrating the states of the node 30-A to the node 30-C after short-term synchronization processing is performed upon completion of the long-term synchronization processing explained with reference to FIG. 20.

FIG. 21 is a diagram illustrating the states of the node 30-A to the node 30-C after short-term synchronization processing is performed upon completion of the long-term synchronization processing explained with reference to FIG. 20. The cluster managing unit 24 of the management device 20 periodically calls the first assigning unit 22 and causes it to calculate the next-role table.

Upon being called by the cluster managing unit 24 after the completion of the long-term synchronization processing, the first assigning unit 22 reassigns, with respect to each of a plurality of partitions, the nodes 30 to serve as the owner node and the backup node in such a way that the redundancy increases using the replicas generated in the long-term synchronization processing.

In the present example, as illustrated in the next-role table in FIG. 21, with respect to the partition #1, the node 30-A is assigned to serve as the owner node and the node 30-B is assigned to serve as the backup node. Moreover, with respect to the partition #2, the node 30-B is assigned to serve as the owner node and the node 30-A is assigned to serve as the backup node. Furthermore, with respect to the partition #3, the node 30-A is assigned to serve as the owner node and the node 30-B is assigned to serve as the backup node.

Then, the cluster managing unit 24 distributes the next-role table to the node 30-A and the node 30-B. Upon receiving the next-role table, the node managing unit 34 of each of the node 30-A and the node 30-B performs short-term synchronization processing and rewrites the contents of the current-role table with the contents of the next-role table. With that, each of the node 30-A and the node 30-B becomes able to perform operations according to its newly-assigned role.

Figure 22:
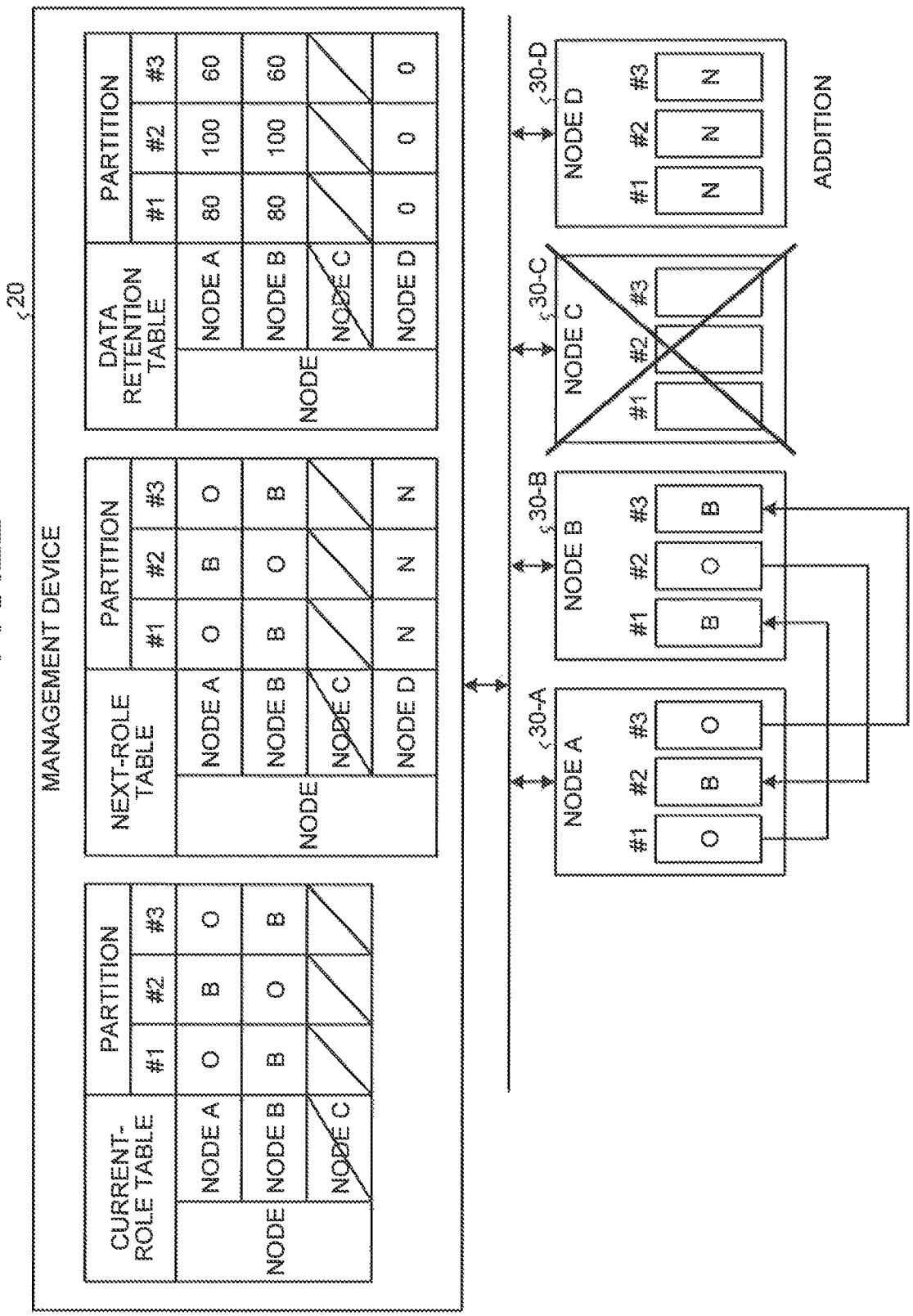
FIG. 22 is a diagram illustrating the states of the node 30-A to a node 30-D in a case in which the node 30-D is added to the state illustrated in FIG. 21.

FIG. 22 is a diagram illustrating the states of the node 30-A to a node 30-D in a case in which the node 30-D is added to the state illustrated in FIG. 21. Herein, for example, it is assumed that the cluster managing unit 24 of the management device 20 detects that the node 30-D is newly added in the state illustrated in FIG. 21.

As illustrated in the data retention table in FIG. 22, the cluster managing unit 24 generates the data retention table in which the node 30-D is added. In response to the addition of the node 30-D in the data retention table, the first assigning unit 22 generates the next-role table in which the node 30-D is added.

Of course, the node 30-D does not have any data pieces stored therein. Thus, immediately after the addition of the node 30-D, the first assigning unit 22 does not change the assignment of the owner nodes and the backup nodes.

Figure 23:
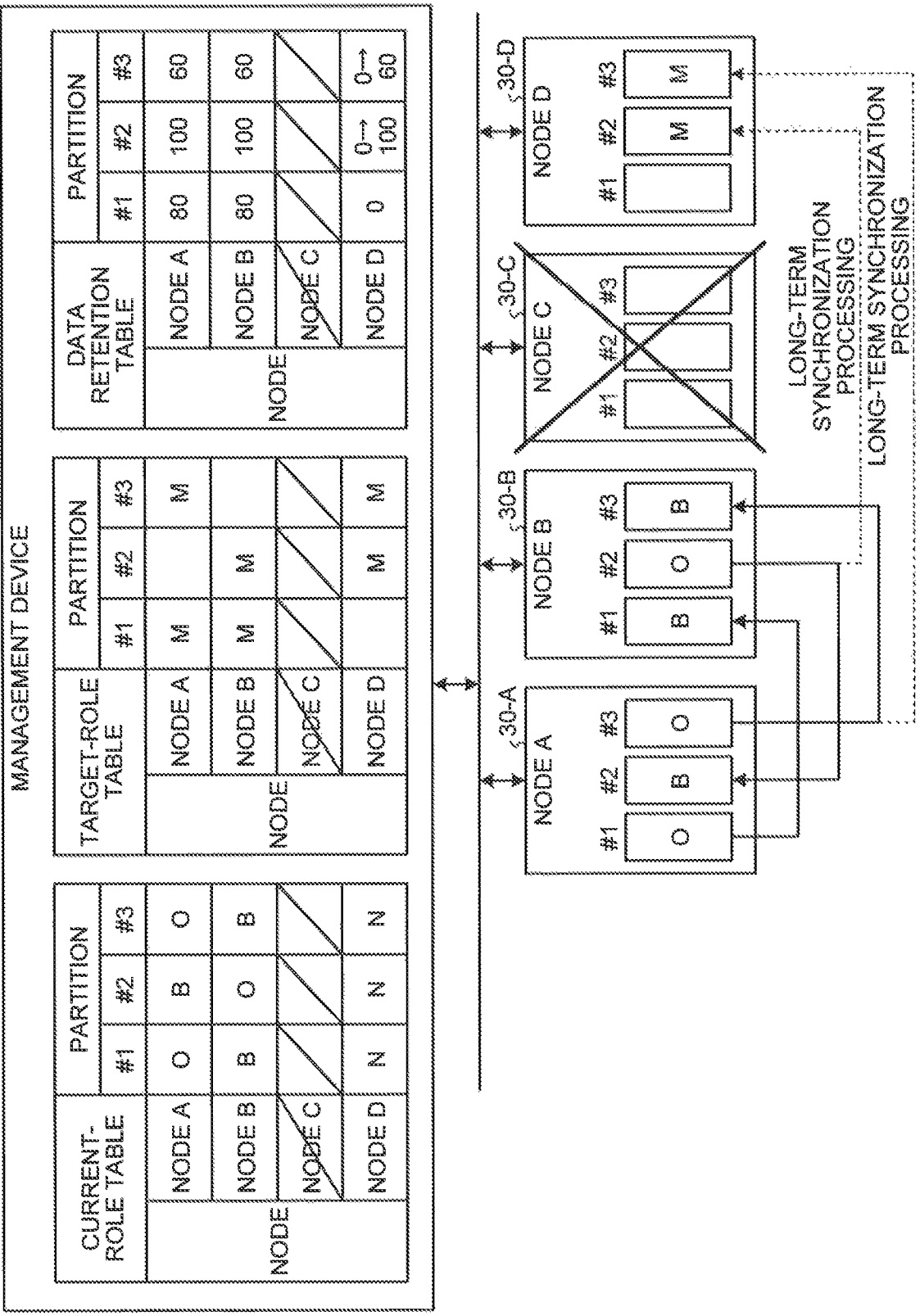
FIG. 23 is a diagram illustrating an example of long-term synchronization processing performed in the state illustrated in FIG. 22.

FIG. 23 is a diagram illustrating an example of long-term synchronization processing performed in the state illustrated in FIG. 22. When a new node 30 is added, the second assigning unit 23 reassigns, with respect to each of a plurality of partitions, the nodes 30 including the new node 30 to serve as the backup candidate nodes. In this case, with respect to each of a plurality of partitions, the second assigning unit 23 assigns the nodes 30 to serve as the backup candidate nodes in such a way that the difference in the number of assigned owner nodes and the number of assigned backup nodes is within a range of values determined in advance among the nodes 30.

In the present example, as a result of the reassignment, as illustrated in the target-role table in FIG. 23; with respect to the partition #1, the node 30-A and the node 30-B are assigned to serve as the backup candidate nodes. Moreover, with respect to the partition #2, the node 30-B and the node 30-D are assigned to serve as the backup candidate nodes. Furthermore, with respect to the partition #3, the node 30-A and the node 30-D are assigned to serve as the backup candidate nodes.

Then, the cluster managing unit 24 distributes the target-role table to the node 30-A, the node 30-B, and the node 30-D. Subsequently, the transferring unit 35 of each of the node 30-A, the node 30-B, and the node 30-D performs long-term synchronization processing with respect to the portion of difference between the current-role table and the target-role table.

That is, the transferring unit 35 of the node 30-B sends the data pieces of the partition #2 to the node 30-D in the background. Moreover, the transferring unit 35 of the node 30-A sends the data pieces of the partition #3 to the node 30-D in the background. At that time, each transferring unit 35 performs the long-term synchronization processing without discontinuing the operations with respect to the access request from the client.

As a result, the node 30-D can store therein a replica of the data pieces of the partition #2. Moreover, as illustrated in the data retention table in FIG. 23, the time stamps of the nodes 30-B and 30-D have the same value for the partition #2.

Besides, the node 30-D can store therein a replica of the data pieces of the partition #3. Moreover, as illustrated in the data retention table in FIG. 23, the time stamps of the nodes 30-A and 30-D have the same value for the partition #3.

Figure 24:
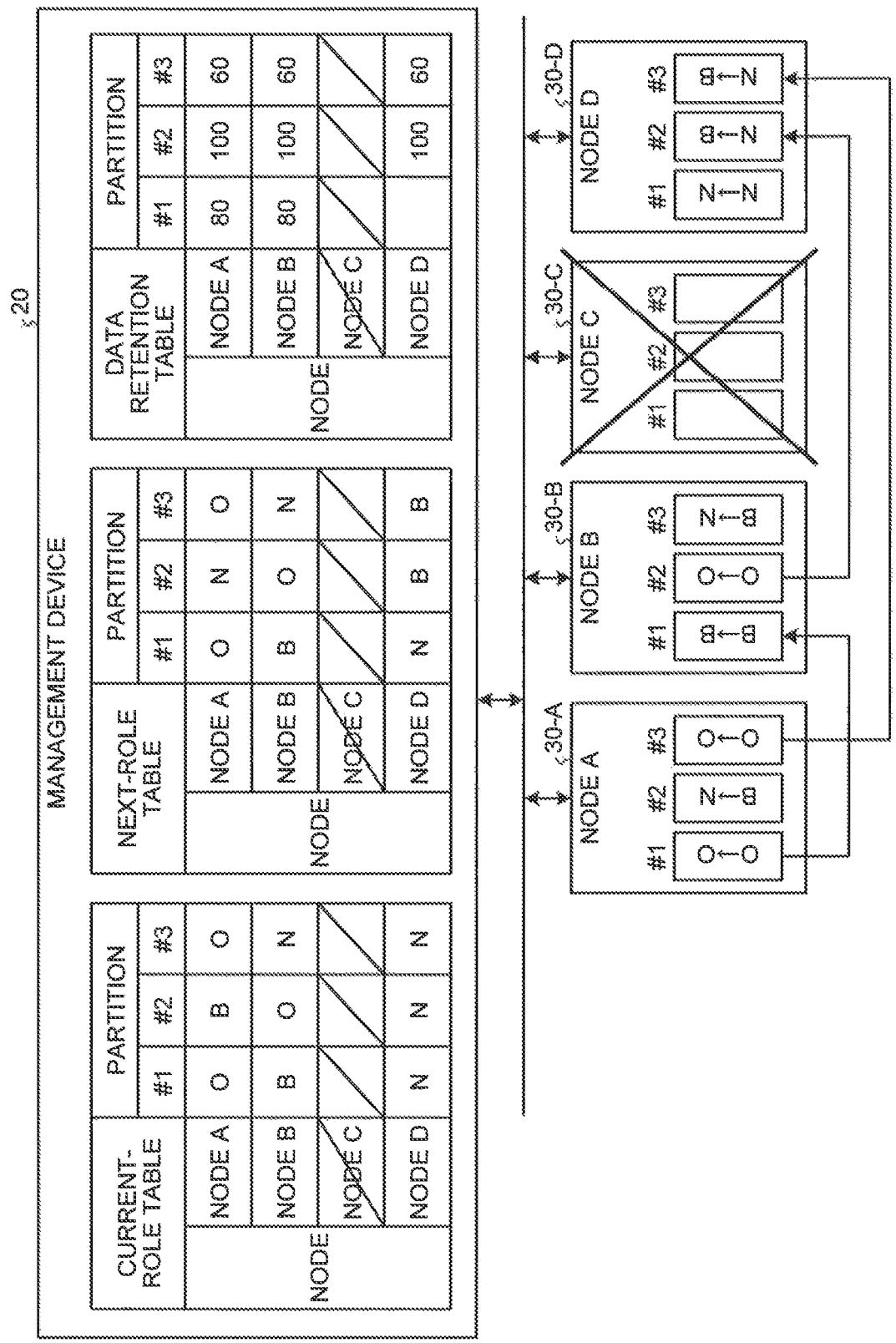
FIG. 24 is a diagram illustrating the states of the node 30-A to the node 30-D after short-term synchronization processing is performed upon completion of the long-term synchronization processing explained with reference to FIG. 23.

FIG. 24 is a diagram illustrating the states of the node 30-A to the node 30-D after short-term synchronization processing is performed upon completion of the long-term synchronization processing explained with reference to FIG. 23. Upon being called by the cluster managing unit 24 after the completion of the long-term synchronization processing, the first assigning unit 22 reassigns, with respect to each of a plurality of partitions, the nodes 30 to serve as the owner node and the backup node in such a way that the processing load becomes more equal among the nodes 30 using the replicas generated in the long-term synchronization processing.

In the present example, as a result of the reassignment, as illustrated in the next-role table in FIG. 24; with respect to the partition #1, the node 30-A is assigned to serve as the owner node and the node 30-B is assigned to serve as the backup node. Moreover, with respect to the partition #2, the node 30-B is assigned to serve as the owner node and the node 30-D is assigned to serve as the backup node. Furthermore, with respect to the partition #3, the node 30-A is assigned to serve as the owner node and the node 30-D is assigned to serve as the backup node.

Then, the cluster managing unit 24 distributes the next-role table to the node 30-A, the node 30-B, and the node 30-D. Upon receiving the next-role table, the node managing unit 34 of each of the node 30-A, the node 30-B, and the node 30-D performs short-term synchronization processing and rewrites the contents of the current-role table with the contents of the next-role table. With that, each of the node 30-A, the node 30-B, and the node 30-D becomes able to perform operations according to its newly-assigned role.

In this way, in the database system 10 according to the present embodiment, a node 30 that would serve as the backup candidate node is assigned, and the data pieces are transferred from a node 30 assigned to serve as the owner node to the node 30 assigned to serve as the backup candidate node. As a result, it becomes possible to ensure redundancy of the database and to even out the processing load of each of a plurality of nodes 30. Besides, in the database system 10, such operations can be performed without discontinuing the operations with respect to the access request from the client. Hence, even if a node 30 is separated off or a node 30 is newly added, data relocation can be done without stopping the system.

Meanwhile, computer programs executed in the management device 20 and the nodes 30 according to the present embodiment are recorded in the form of installable or executable files in a computer-readable recording medium such as a CD-ROM, a flexible disk (FD), a CD-R, or a DVD (Digital Versatile Disk).

Alternatively, the computer programs executed in the management device 20 and the nodes 30 according to the present embodiment can be saved as downloadable files on a computer connected to the Internet or can be made available for distribution through a network such as the Internet.

Still alternatively, the computer programs executed in the management device 20 and the nodes 30 according to the present embodiment can be stored in advance in a ROM or the like.

The computer program executed in the management device 20 according to the present embodiment contains a module for each of the abovementioned constituent elements (the table memory unit 21, the first assigning unit 22, the second assigning unit 23, and the cluster managing unit 24). As the actual hardware, for example, a CPU (processor) reads the computer program from the abovementioned recording medium and runs it such that the computer program is loaded in a main memory device. As a result, the table memory unit 21, the first assigning unit 22, the second assigning unit 23, and the cluster managing unit 24 are generated in the main memory device.

Similarly, the computer program executed in the nodes 30 according to the present embodiment contains a module for each of the abovementioned constituent elements (the data storing unit 31, the table memory unit 32, the access processing unit 33, the node managing unit 34, and the transferring unit 35). As the actual hardware, for example, a CPU (processor) reads the computer program from the abovementioned recording medium and runs it such that the computer program is loaded in a main memory device. As a result, the data storing unit 31, the table memory unit 32, the access processing unit 33, the node managing unit 34, and the transferring unit 35 are generated in the main memory device.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A database system comprising:
a management device; and
a plurality of nodes,
wherein:

the database system stores a database by being partitioned into a plurality of partitions;

the management device includes a first memory device and a first hardware processor;

the first memory device stores a current-role table, a next-role table, and a target-role table;

the current-role table stores, with respect to each of the plurality of partitions, whether each of the plurality of nodes is assigned either to serve as an owner node or to serve as a backup node, or neither to serve as the owner node nor to serve as the backup node;

the next-role table stores, with respect to each of the plurality of partitions, whether each of the plurality of nodes is next assigned either to serve as the owner node or to serve as the backup node, or neither to serve as the owner node nor to serve as the backup node;

the target-role table stores, with respect to each of the plurality of partitions, whether each of the plurality of nodes is assigned as a backup candidate node;

the first hardware processor:
calculates the next-role table;
calculates the target-role table;
calculates the next-role table on a periodic basis, when the calculated next-role table changes from the current-role table, distributes the calculated next-role table to each of the plurality of nodes, and
after the next-role table is distributed, updates contents of the current-role table stored in the first memory device to contents of the next-role table; and
calculates the target-role table on a periodic basis and distributes the calculated target-role table to each of the plurality of nodes;

each of the plurality of nodes includes a data storing device, a second memory device, and a second hardware processor;

the data storing device stores, some or all of data that is already received from another node assigned to serve as the owner node or the backup node, in data pieces of partitions to which a concerned node is assigned to serve as the owner node or the backup node according to the current-role table among the plurality of partitions and in data pieces of partitions to which the concerned node is assigned to serve as the backup candidate node according to the target-role table among the plurality of partitions;

the second memory device stores the current-role table, the next-role table, and the target-role table;

the second hardware processor
receives from a client an access request with respect to a partition assigned as the owner node according to the current-role table, and performs an operation according to the access request with respect to data pieces of the partition assigned as the owner node according to the current-role table;
when receiving the next-role table from the management device,
stores the received next-role table in the second memory device,
according to the received next-role table, with respect to each of the plurality of partitions and for data pieces stored in a node serving as the owner node and data pieces stored in a node serving as the backup node indicated in the next-role table, causes the operation according to the access request to be temporarily discontinued, a replication operation to be performed, and synchronization processing to be performed, and
when the synchronization processing is completed, updates contents of the current-role table stored in the second memory device to contents of the next-role table;
receives the target-role table from the management device and stores the received target-role table in the second memory device; and
transfers and stores, without discontinuing the operation according to the access request, the data pieces of the partitions assigned as the owner node or the backup node according to the current-role table, to and in another node that is assigned to serve as the backup candidate node according to the target-role table and that is neither assigned to serve as the owner node nor assigned to serve as the backup node according to the current-role table.

2. The database system according to claim 1, wherein the first hardware processor performs, in the calculating the next-role table
excluding a node which is separated off from the plurality of nodes indicated in the current-role table and adding a new node, and
calculating the next-role table based on a new plurality of nodes to which a new node is added that can become the owner node or the backup node by completion of sending the data pieces to the node assigned to serve as the backup candidate node.

3. The database system according to claim 1, wherein the second hardware processors performs, in the transferring,
sending, without discontinuing the operation according to the access request, the data pieces of the partitions, to which the concerned node is assigned to serve as the owner node or the backup node according to the current-role table, to another node that is assigned to serve as the backup candidate node according to the target-role table and that is neither assigned to serve as the owner node nor assigned to serve as the backup node according to the current-role table, and
receiving, without discontinuing the operation according to the access request, the data pieces of the partitions to which the concerned node is assigned to serve as the backup candidate node according to the target-role table and that is neither assigned to serve as the owner node nor assigned to serve as the backup node according to the current-role table, from the another node that is assigned to serve as the owner node or the backup node according to the current-role table.

4. The database system according to claim 2, wherein the first hardware processor performs, in the calculating the next-role table
excluding a node which is separated off from the plurality of nodes indicated in the current-role table and adding a new node, and
calculating the next-role table based on a new plurality of nodes to which a new node is added that can become the owner node or the backup node by completion of sending the data pieces to the node assigned to serve as the backup candidate node.

5. The database system according to claim 1, wherein the first hardware processor calculates the next-role table and the target-role table at different cycles.

6. The database system according claim 1, wherein the second hardware processor performs, in the transferring,
   detecting a difference between the current-role table and the target-role table, and
   when there is the difference between the current-role table and the target-role table, detecting the another node that is assigned to serve as the backup candidate node according to the target-role table and that is neither assigned to serve as the owner node nor assigned to serve as the backup node according to the current-role table.

7. The database system according to claim 1, wherein
   the first memory device further stores a data retention table;
   the second memory device stores a portion in the data retention table corresponding to the concerned node;
   the data retention table stores a time stamp of each of the plurality of nodes with respect to each of the plurality of partitions, or stores a size or data count of data pieces of a corresponding partition; and
   the management device receives the data retention table on a periodic basis from each of the plurality of nodes, the first hardware processor:
      stores, in the first memory device, the data retention tables received from all of the plurality of nodes; and
      performs an operation to separate off a node, from which the data retention table is not received, from the database system and updates the data retention table stored in the first memory device by deleting contents of the separated node from the data retention table.

8. The database system according to claim 1, wherein the first hardware processor performs, in the calculating the next-role table,
   assigning nodes to serve as owner nodes, with respect to all of the plurality of partitions, and
   calculating the next-role table so as to assign nodes to serve as backup nodes with respect to all of the plurality of partitions to the extent possible.

9. The database system according to claim 8, wherein the first hardware processor performs, in the calculating the target-role table, calculating the target-role table by assigning backup candidate nodes to partitions in ascending order of a number of nodes assigned to serve as the backup nodes among the plurality of partitions.

10. The database system according to claim 8, wherein the first hardware processor performs, in the calculating the target-role table, calculating the target-role table in such a way that a number of the backup candidate nodes assigned to each of the plurality of nodes is smaller than a preset reference value.

11. A data processing method implemented in a database system including a management device and a plurality of nodes, and storing a database by being partitioned into a plurality of partitions, wherein
   the management device includes a first memory device;
   the first memory device stores a current-role table, a next-role table, and a target-role table;
   the current-role table stores, with respect to each of the plurality of partitions, whether each of the plurality of nodes is assigned either to serve as an owner node or to serve as a backup node, or neither to serve as the owner node nor to serve as the backup node;
   the next-role table stores, with respect to each of the plurality of partitions, whether each of the plurality of nodes is next assigned either to serve as the owner node or to serve as the backup node, or neither to serve as the owner node nor to serve as the backup node; and
   the target-role table stores, with respect to each of the plurality of partitions, whether each of the plurality of nodes is assigned as a backup candidate node,
   the method comprising:
      by the management device,
         calculating the next-role table on a periodic basis,
            when the calculated next-role table changes from the current-role table, distributing the calculated next-role table to each of the plurality of nodes, and
            after the next-role table is distributed, updating contents of the current-role table stored in the first memory device to contents of the next-role table; and
         calculating the target-role table on a periodic basis and distributing the calculated target-role table to each of the plurality of nodes,
   wherein:
      each of the plurality of nodes includes a data storing device and a second memory device;
      the data storing device stores, some or all of data that is already received from another node assigned to serve as the owner node or the backup node, in data pieces of partitions to which a concerned node is assigned to serve as the owner node or the backup node according to the current-role table among the plurality of partitions and in data pieces of partitions to which the concerned node is assigned to serve as the backup candidate node according to the target-role table among the plurality of partitions;
      the second memory device stores the current-role table, the next-role table, and the target-role table; and
   the method further comprises:
      by each of the plurality of nodes,
         receiving from a client an access request with respect to a partition assigned as the owner node according to the current-role table, and performing an operation according to the access request with respect to data pieces of the partition assigned as the owner node according to the current-role table;
         when receiving the next-role table from the management device,
            storing the received next-role table in the second memory device,
            according to the received next-role table, with respect to each of the plurality of partitions and for data pieces stored in a node serving as the owner node and data pieces stored in a node serving as the backup node indicated in the next-role table, causing the operation according to the access request to be temporarily discontinued, a replication operation to be performed, and synchronization processing to be performed, and
            when the synchronization processing is completed, updating contents of the current-role table stored in the second memory device to contents of the next-role table;
         receiving the target-role table from the management device and storing the received target-role table in the second memory device; and
         transferring and storing, without discontinuing the operation according to the access request, the data pieces of the partitions assigned as the owner node or the backup node according to the current-role table, to and in another node that is assigned to serve as the backup candidate node according to the target-role table and that is neither assigned to serve as the owner node nor assigned to serve as the backup node according to the current-role table.

* * * * *